(12) United States Patent
Vanguardia et al.

(10) Patent No.: US 10,992,689 B2
(45) Date of Patent: Apr. 27, 2021

(54) SYSTEMS AND METHODS FOR RELATING NETWORK INTRUSIONS TO PASSENGER-OWNED DEVICES

(71) Applicant: The Boeing Company, Chicago, IL (US)

(72) Inventors: Michael R. Vanguardia, Kent, WA (US); Daniel Nguyen, Auburn, WA (US); Timothy M. Mitchell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 165 days.

(21) Appl. No.: 16/134,882

(22) Filed: Sep. 18, 2018

(65) Prior Publication Data

US 2020/0092308 A1    Mar. 19, 2020

(51) Int. Cl.

| | | |
|---|---|---|
| *H04W 12/08* | (2021.01) | |
| *H04W 48/04* | (2009.01) | |
| *H04L 29/06* | (2006.01) | |
| *H04W 4/42* | (2018.01) | |
| *B64D 45/00* | (2006.01) | |
| *H04W 84/18* | (2009.01) | |
| *H04W 12/12* | (2021.01) | |

(52) U.S. Cl.
CPC ...... *H04L 63/1416* (2013.01); *B64D 45/0015* (2013.01); *H04W 4/42* (2018.02); *H04W 84/18* (2013.01); *B64D 45/0053* (2019.08)

(58) Field of Classification Search
None
See application file for complete search history.

(56) References Cited

U.S. PATENT DOCUMENTS

| | | | |
|---|---|---|---|
| 7,409,716 B2 | 8/2008 | Barnett et al. | |
| 9,380,428 B1 * | 6/2016 | Dame | H04B 7/18504 |
| 9,938,019 B2 | 4/2018 | Floyd et al. | |
| 2003/0027550 A1 * | 2/2003 | Rockwell | B64D 45/0059 |
| | | | 455/410 |
| 2003/0027551 A1 * | 2/2003 | Rockwell | H04W 12/12 |
| | | | 455/410 |
| 2007/0150954 A1 | 6/2007 | Shon | |
| 2008/0086554 A1 * | 4/2008 | Royalty | B64D 45/0063 |
| | | | 709/224 |

(Continued)

OTHER PUBLICATIONS

EConnect Wireless Router Cabin Management and Entertainment System. CollinsAerospace. (Year: 2019).*
Cyber-Security Challenges for Wireless Networked Aircraft. Rajasekeran et al. (Year: 2013).*
Challenges of Security and Trust of Mobile Devices as Digital Avionics Component. Akram et al. (Year: 2016).*

(Continued)

*Primary Examiner* — Venkat Perungavoor
(74) *Attorney, Agent, or Firm* — Kolisch Hartwell, P.C.

(57) ABSTRACT

A vehicle network system is configured to detect unauthorized intrusions by a passenger-owned device, and to identify the passenger-owned device based at least in part on stored information representative of network communications. The vehicle network system can be further configured to determine a position of the intruding passenger-owned device within a passenger area of the vehicle and to obtain a name and/or camera image of a passenger associated with the device. The position of the intruding device can be identified based at least in part on communications between the intruding device and one or more network-access devices distributed throughout the passenger area.

20 Claims, 6 Drawing Sheets

(56) References Cited

U.S. PATENT DOCUMENTS

| | | | | |
|---|---|---|---|---|
| 2011/0133892 | A1* | 6/2011 | Nohr | G07C 9/28 |
| | | | | 340/10.1 |
| 2013/0305357 | A1 | 11/2013 | Ayyagari et al. | |
| 2016/0055699 | A1* | 2/2016 | Vincenti | H04W 12/04 |
| | | | | 340/5.61 |
| 2017/0251335 | A1* | 8/2017 | Nishidai | H04W 4/023 |
| 2018/0049005 | A1* | 2/2018 | Still | H04L 63/1425 |
| 2018/0103421 | A1* | 4/2018 | Coney | H04W 4/38 |
| 2018/0192292 | A1* | 7/2018 | Coney | H04W 12/08 |
| 2018/0276974 | A1* | 9/2018 | Talty | G08B 21/24 |
| 2018/0302859 | A1* | 10/2018 | Elangovan | G07C 9/00309 |
| 2018/0365242 | A1* | 12/2018 | Sano | H04N 21/4334 |
| 2019/0075611 | A1* | 3/2019 | Rabii | H04W 4/80 |
| 2019/0172168 | A1* | 6/2019 | Singh | H04L 67/20 |

OTHER PUBLICATIONS

The Next Paradigm Shift: From Vehicular Networks to Vehicular Clouds. Olariu et al. Mobile Ad Hoc Networking: Cutting Edge Directions. (Year: 2013).*
European Patent Office, European Patent Application No. 19197757.8, Extended European Search Report, dated Nov. 28, 2019, 10 pages.
Harnett et al., FAA Security, State of the State and Beyond, Airborne Network Cyber Security Issues for E-Enabled Aircraft Certification and Operations, Presented to 2008 National Software and Airborne Electronic Hardware Standardization Conference, Aug. 20, 2008, U.S. Department of Transportation, Research and Innovative Technology Administration, 53 pages.

* cited by examiner

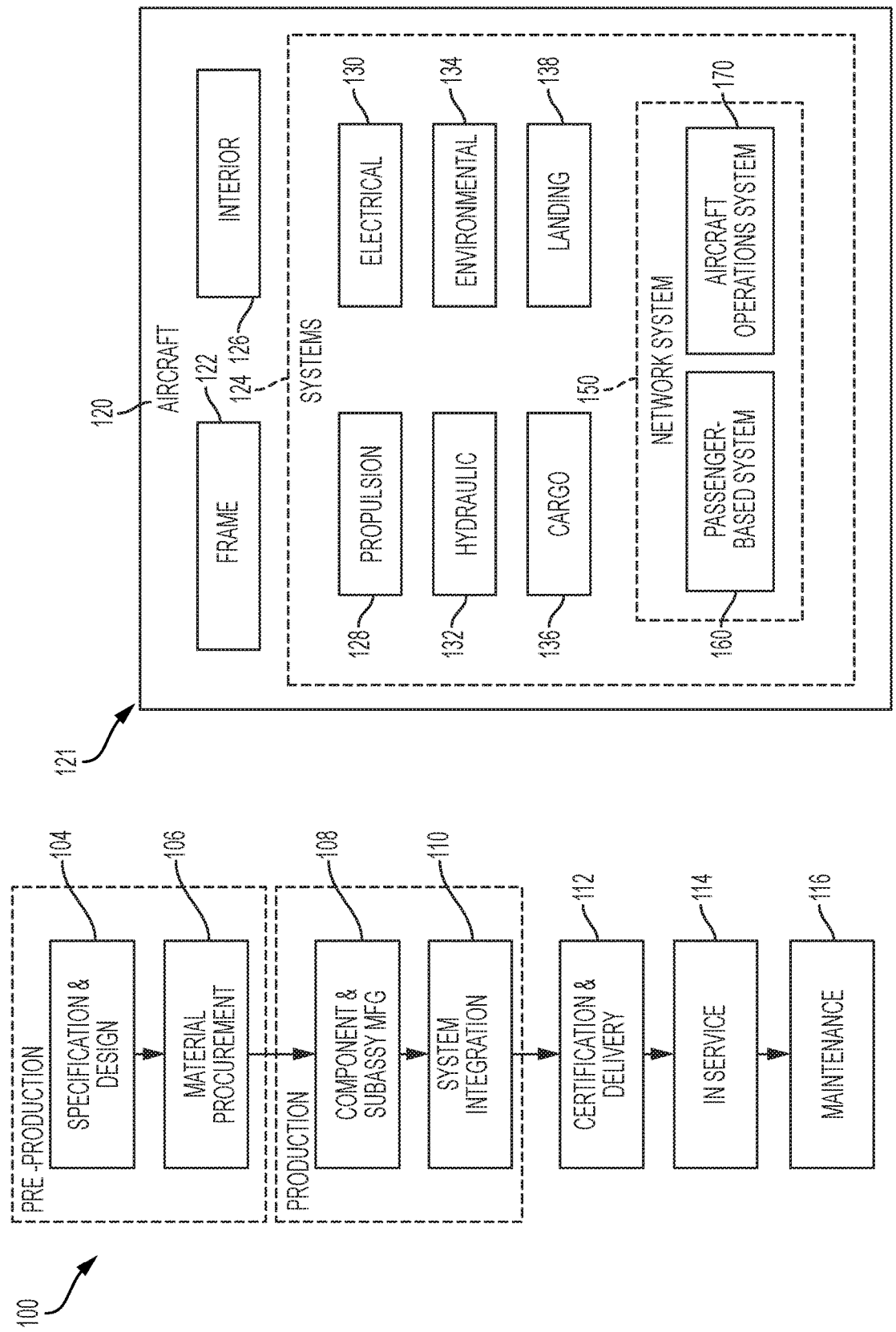

SYSTEMS AND METHODS FOR RELATING NETWORK INTRUSIONS TO PASSENGER-OWNED DEVICES

FIELD

This disclosure relates to network security. More specifically, the disclosed embodiments relate to identifying the source of an unauthorized intrusion on a network of a vehicle.

INTRODUCTION

There is a growing demand for network connectivity (e.g., Internet access) for passengers on aircraft and other vehicles. As passenger connectivity increases, it is increasingly important that network security systems be capable of deterring malicious passenger network activity. For example, there is a need for improved systems and methods for deterring unauthorized intrusions on vehicle networks by passenger-owned devices.

SUMMARY

The subject matter of the present disclosure includes systems, apparatuses, and methods relating to data intrusions on a vehicle network. In some embodiments, a correlation engine of a network system on board a vehicle can include a network bus, a network processor connected to the network bus, a network storage area of at least a first storage device connected to the network bus, and a first plurality of wireless network-access devices distributed in a passenger area of the vehicle that are accessible by a passenger using a passenger-owned device having a corresponding wireless communication device. The network processor can be configured to detect an unauthorized data intrusion on the network system by the passenger-owned device communicating wirelessly with the network system through at least one of the first plurality of network-access devices. The correlation engine can comprise a correlation-engine processor and a correlation-engine storage area of the at least a first storage device, wherein the correlation-engine processor is configured to receive from the network processor intrusion information associated with a detected unauthorized data intrusion; store on the correlation-engine storage area communications information representative of data communications occurring on the network bus; and identify the passenger-owned device based at least in part on the stored communications information. The data communications can include information that is unique to the passenger-owned device.

In some embodiments, a method relates a data intrusion on a network of a vehicle to a passenger on the vehicle. The network can include a network processor, a network storage area of at least a first storage device, and a first plurality of wireless network-access devices distributed in a passenger area of the vehicle that are accessible by a passenger using a passenger-owned device having a corresponding wireless communication device. The method can comprise storing on a correlation-engine storage area communications information representative of data communications occurring on the network system, which data communications can include information that is unique to the passenger-owned device. The method can further comprise receiving from the network processor intrusion information associated with a detected unauthorized data intrusion on the network by the passenger-owned device communicating wirelessly with the network system through at least one of the first plurality of network-access devices; and identifying the passenger-owned device based at least in part on the stored communications information.

In some embodiments, a network system on board an aircraft can comprise a network processor, a network storage device operatively coupled to the network processor, and a first plurality of wireless network-access devices distributed in a passenger cabin of the aircraft that are accessible by a passenger using a passenger-owned device having a corresponding wireless communication device. The network processor can be configured to store on the network storage device communications information representative of data communications occurring on the network system. The data communications can include information that is unique to the passenger-owned device, network use information representative of network-access devices of the plurality of the network-access devices used for communications received from the passenger-owned device, and passenger-cabin configuration information relating passenger seat locations to locations of the first plurality of wireless network-access devices. The network processor can be further configured to detect an unauthorized data intrusion on the network system by the passenger-owned device communicating wirelessly with the network system through at least one of the first plurality of network-access devices; and determine at least one seat location associated with the passenger-owned device based at least in part on the stored communications information, network use information, and passenger-cabin-configuration information.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 1 is a flow diagram depicting steps of an illustrative method of manufacturing and servicing an aircraft.

FIG. 2 is a schematic diagram of an illustrative aircraft.

DETAILED DESCRIPTION

Figure 3:
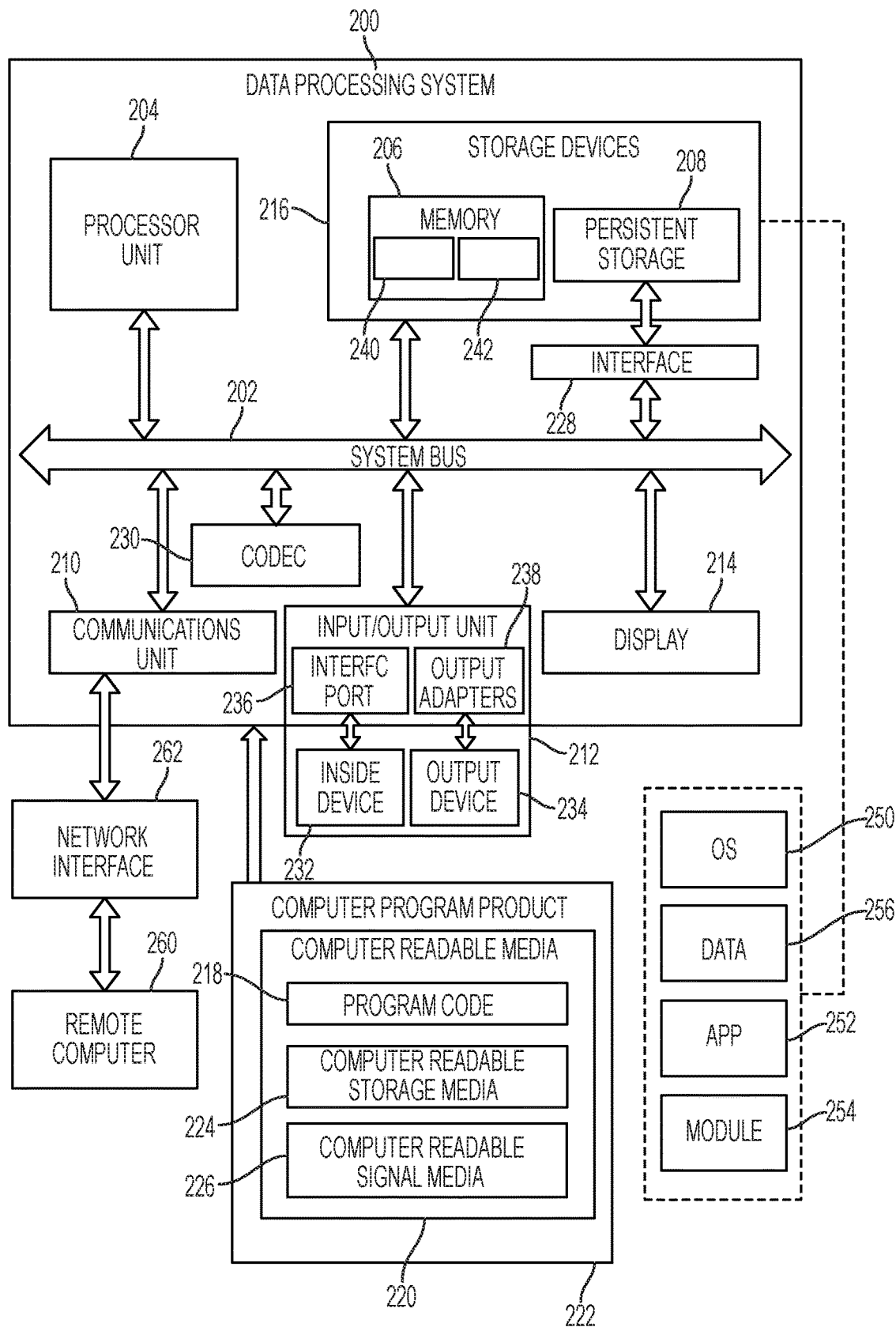
FIG. 3 is a schematic diagram of an illustrative data processing system.

Various aspects and examples of a vehicle network system, as well as related methods, are described below and illustrated in the associated drawings. Unless otherwise specified, a vehicle network system, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein may be included in other similar devices and methods, including being interchangeable between disclosed embodiments. The following description of various examples is merely illustrative in nature and is in no way intended to limit the examples, their applications, or their uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion. The Examples, Components, and Alternatives section is further divided into subsections A through F, each of which is labeled accordingly.

Definitions

The following definitions apply herein, unless otherwise indicated.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, in the order they are introduced in a particular context and are not intended to show serial or numerical limitation, or be fixed identifiers for the group members.

"Coupled" means to be in such relation that the performance of one influences the performance of the other, may include being connected, either permanently or releasably, whether directly or indirectly through intervening components, and is not necessarily limited to physical connection(s).

Overview

In general, a vehicle network system is configured to relate an unauthorized data intrusion on a vehicle network to a passenger-owned device responsible for the intrusion. The vehicle can, for example, be an aircraft, ship or other watercraft, train, subway train, bus, car, truck, and/or any other suitable passenger vehicle having a network accessible by passengers using a suitable data processing system. For example, the vehicle can be an aircraft having a network system configured to allow passengers to access the network using their personal devices (also called passenger-owned devices). Passengers can use passenger-owned devices connected to the vehicle network to communicate with, e.g., an in-flight entertainment system, an external network such as the Internet, and/or any other suitable system accessible via the vehicle network.

Vehicle network access may increase passengers' convenience and/or enjoyment. However, there exists a possibility that a passenger could use a passenger-owned device connected to the vehicle network to attempt to access a portion of the vehicle network system that is off-limits to passengers. For example, a passenger could connect their device to a passenger-based portion of the vehicle network via a network-access device provided for passenger use, and then communicate with a restricted network system that passengers are not authorized to access. The vehicle network system is configured to detect the unauthorized communication and to identify the passenger-owned device that sent the communication. Identification of the intruding passenger-owned device can be based at least in part on stored information about communications occurring on the vehicle network, information about use of network-access devices used by passenger-owned devices to access the vehicle network, and/or passenger-related information such as vehicle seat assignments. Once the intruding passenger-owned device has been identified, a passenger or group of passengers associated with the device can be identified for investigation. For example, if the vehicle is an aircraft, passengers associated with the intruding device can be identified while the aircraft is in the air and met by law-enforcement and/or security personnel when the aircraft lands.

Technical solutions are disclosed herein for identifying a passenger-owned device that has performed an unauthorized intrusion on a vehicle network. Specifically, the disclosed systems and methods address a technical problem tied to computer technology and arising in the realm of computer networks, namely the technical problem of relating an unauthorized network intrusion to the device responsible for the intrusion. Accordingly, the disclosed systems and methods do not merely recite the performance of some known practice along with the requirement to perform it on a computer. Rather they provide a solution necessarily rooted in computer technology to overcome a problem specifically arising in the realm of computer networks.

Aspects of a vehicle network system can be embodied as a computer method, computer system, or computer program product. Accordingly, aspects of the vehicle network system can take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the vehicle network system can take the form of a computer program product embodied in a computer-readable medium (or media) having computer-readable program code/instructions embodied thereon.

Any combination of computer-readable media can be utilized. Computer-readable media can be a computer-readable signal medium and/or a computer-readable storage medium. A computer-readable storage medium can include an electronic, magnetic, optical, electromagnetic, infrared, and/or semiconductor system, apparatus, or device, or any suitable combination of these. More specific examples of a computer-readable storage medium can include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium can include any suitable non-transitory, tangible medium that can contain or store a program for use by or in connection with an instruction execution system, apparatus, or device.

A computer-readable signal medium can include a propagated data signal with computer-readable program code embodied therein, for example, in baseband or as part of a carrier wave. Such a propagated signal can take any of a variety of forms, including, but not limited to, electromagnetic, optical, sonic, and/or any suitable combination thereof. A computer-readable signal medium can include any computer-readable medium that is not a computer-readable storage medium and that is capable of communicating, propagating, or transporting a program for use by or in connection with an instruction execution system, apparatus, or device.

Program code embodied on a computer-readable medium can be transmitted using any appropriate medium, including but not limited to wireless, wireline, optical fiber cable, sonic, radio frequency (RF), and/or the like, and/or any suitable combination of these.

Computer program code for carrying out operations for aspects of the vehicle network system can be written in one or any combination of programming languages, including an object-oriented programming language such as Java, Smalltalk, C++, and/or the like, and conventional procedural programming languages, such as C. Mobile apps can be developed using any suitable language, including those previously mentioned, as well as Objective-C, Swift, C #, HTML5, and the like.

Aspects of the vehicle network system are described below with reference to flowchart illustrations and/or block diagrams of methods, apparatuses, systems, and/or computer program products. Each block and/or combination of blocks in a flowchart and/or block diagram can be implemented by computer program instructions. The computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions can be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the vehicle network system. In this regard, each block may represent a module, segment, or portion of code, which comprises one or more executable instructions for implementing the specified logical function(s). In some implementations, the functions noted in the block can occur out of the order noted in the drawings. For example, two blocks shown in succession can, in fact, be executed substantially concurrently, or the blocks can sometimes be executed in the reverse order, depending upon the functionality involved. Each block and/or combination of blocks can be implemented by special purpose hardware-based systems (or combinations of special purpose hardware and computer instructions) that perform the specified functions or acts.

In light of the above description, the term "processing logic" may be utilized to include any suitable device or hardware configured to process data by performing one or more logical and/or arithmetic operations (e.g., executing coded instructions). For example, processing logic can include one or more processors (e.g., central processing units (CPU) and/or graphics processing units (GPU)), microprocessors, clusters of processing cores, FPGAs (field-programmable gate arrays), artificial intelligence (AI) accelerators, digital signal processors, and/or any other suitable combination of logic hardware.

EXAMPLES, COMPONENTS, AND ALTERNATIVES

The following sections describe selected aspects of exemplary vehicle network systems, as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Aircraft and Associated Method

Examples disclosed herein may be described in the context of an illustrative aircraft manufacturing and service method 100 (see FIG. 1) and an illustrative aircraft 120 (see FIG. 2). Method 100 includes a plurality of processes, stages, or phases. During pre-production, method 100 can include a specification and design phase 104 of aircraft 120 and a material procurement phase 106. During production, a component and subassembly manufacturing phase 108 and a system integration phase 110 of aircraft 120 can take place. Thereafter, aircraft 120 can go through a certification and delivery phase 112 to be placed into in-service phase 114. While in service (e.g., by an operator), aircraft 120 can be scheduled for routine maintenance and service 116 (which can also include modification, reconfiguration, refurbishment, and so on of one or more systems of aircraft 120). While the examples described herein relate generally to operational use during in-service phase 114 of aircraft 120, they can be practiced at other stages of method 100.

Each of the processes of method 100 can be performed or carried out by a system integrator, a third party, and/or an operator (e.g., a customer). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

Illustrative method 100 can be used to produce an aircraft 120. Aircraft 120 is an example of a vehicle 121 having a vehicle network as described above. As shown in FIG. 2, aircraft 120 can include a frame 122 with a plurality of systems 124 and an interior 126. Examples of plurality of systems 124 include one or more of a propulsion system 128, an electrical system 130, a hydraulic system 132, an environmental system 134, a cargo system 136, a landing system 138, and a vehicle network system 150. Vehicle network system 150 can include, e.g., a passenger-based system 160 that passengers can be authorized to access, and an aircraft operations system 170 that passengers are typically not authorized to access. Each of the plurality of systems 124 can comprise various subsystems, such as controllers, processors, actuators, effectors, motors, generators, etc., depending on the functionality involved. Any number of other systems can be included. Although an aerospace example is shown, the principles disclosed herein can be applied to other industries, such as the automotive industry, rail transport industry, and nautical transport industry. Accordingly, in addition to aircraft 120, the principles disclosed herein can apply to other vehicles, e.g., land vehicles, marine vehicles, etc. Apparatuses and methods shown or described herein can be employed during any one or more of the stages of the manufacturing and service method 100.

B. Illustrative Data Processing System

As shown in FIG. 3, this example describes a data processing system 200 (also referred to as a computer, computing system, and/or computer system). In this example, data processing system 200 is an illustrative data processing system suitable for implementing aspects of the vehicle network system described above. More specifically, devices that are examples of data processing systems (e.g., smartphones, tablets, personal computers) can be used by passengers of aircraft 120 or another suitable vehicle 121 to access the vehicle network. Additionally, vehicle network system 150 typically comprises one or more data processing systems, and/or components thereof, as describe in more detail in the next section. For example, a data processing system can be used to correlate information about unauthorized data intrusions with information about passenger-owned devices in order to relate the intrusion to one or more specific passenger-owned devices.

In this illustrative example, data processing system 200 includes a system bus 202 (also referred to as communications framework). System bus 202 can provide communications between a processor unit 204 (also referred to as a processor or processors), a memory 206, a persistent storage 208, a communications unit 210, an input/output (I/O) unit 212, a codec 230, and/or a display 214. Memory 206, persistent storage 208, communications unit 210, input/output (I/O) unit 212, display 214, and codec 230 are examples of resources that may be accessible by processor unit 204 via system bus 202.

Processor unit 204 serves to run instructions that can be loaded into memory 206. Processor unit 204 can comprise a number of processors, a multi-processor core, and/or a particular type of processor or processors (e.g., a central processing unit (CPU), graphics processing unit (GPU), etc.), depending on the particular implementation. Further, processor unit 204 can be implemented using a number of heterogeneous processor systems in which a main processor is present with secondary processors on a single chip. As another illustrative example, processor unit 204 can be a symmetric multi-processor system containing multiple processors of the same type.

Memory 206 and persistent storage 208 are examples of system storage devices 216. A storage device can include any suitable hardware capable of storing information (e.g., digital information), such as data, program code in functional form, and/or other suitable information, either on a temporary basis or a permanent basis.

System storage devices 216 also may be referred to as computer-readable storage devices or computer-readable media. Memory 206 can include a volatile storage memory 240 and a non-volatile memory 242. A basic input/output system (BIOS) containing the basic routines to transfer information between elements within the data processing system 200, such as during start-up, can be stored in non-volatile memory 242. Persistent storage 208 can take various forms, depending on the particular implementation.

Persistent storage 208 can contain one or more components or devices. For example, persistent storage 208 can include one or more devices such as a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more of these devices can be removable and/or portable, e.g., a removable hard drive. Persistent storage 208 can include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 208 to system bus 202, a removable or non-removable interface is typically used, such as interface 228.

Input/output (I/O) unit 212 allows for input and output of data with other devices that can be connected to data processing system 200 (i.e., input devices and output devices). For example, input device 232 can include one or more pointing and/or information-input devices such as a keyboard, a mouse, a trackball, stylus, touch pad or touch screen, microphone, joystick, game pad, satellite dish, electronic sensor, scanner, TV tuner card, digital camera, digital video camera, web camera, and/or the like. These and other input devices can connect to processor unit 204 through system bus 202 via interface port(s) 236. Interface port(s) 236 can include, for example, a serial port, a parallel port, a game port, and/or a universal serial bus (USB).

Output devices 234 can use some of the same types of ports, and in some cases the same actual ports, as input device(s) 232. For example, a USB port can be used to provide input to data processing system 200 and to output information from data processing system 200 to an output device 234. Output adapter 238 is provided to illustrate that there are some output devices 234 (e.g., monitors, speakers, and printers, among others) which require special adapters. Output adapters 238 can include, e.g. video and sounds cards that provide a means of connection between the output device 234 and system bus 202. Other devices and/or systems of devices can provide both input and output capabilities, such as remote computer(s) 260. Display 214 can include any suitable human-machine interface or other mechanism configured to display information to a user, e.g., a CRT, LED, or LCD monitor or screen, etc.

Communications unit 210 refers to any suitable hardware and/or software employed to provide for communications with other data processing systems or devices. While communication unit 210 is shown inside data processing system 200, it can additionally or alternatively be at least partially external to data processing system 200. Communications unit 210 can include internal and external technologies, e.g., modems (including regular telephone grade modems, cable modems, and DSL modems), network access devices, ISDN adapters, and/or wired and wireless Ethernet cards, hubs, routers, etc. Data processing system 200 can operate in a networked environment (for example, via a network of onboard computers, or a network of aircraft 120 and/or another suitable vehicle), using logical connections to one or more remote computers 260. A remote computer(s) 260 can include a personal computer (PC), a server, a router, a network PC, a workstation, a microprocessor-based appliance, a peer device, a smart phone, a tablet, another network note, and/or the like. Remote computer(s) 260 typically include many of the elements described relative to data processing system 200. Remote computer(s) 260 can be logically connected to data processing system 200 through a network interface 262 which is connected to data processing system 200 via communications unit 210. Network interface 262 encompasses wired and/or wireless communication networks, such as a network of aircraft 120 or of another suitable vehicle. Network interface 262 can include local-area networks (LAN), wide-area networks (WAN), and cellular networks. LAN technologies can include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 230 can include an encoder, a decoder, or both, comprising hardware, software, or a combination of hardware and software. Codec 230 can include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 230 is depicted as a separate component, codec 230 can be contained or implemented in memory, e.g., non-volatile memory 242.

Non-volatile memory 242 can include read only memory (ROM), programmable ROM (PROM), electrically programmable ROM (EPROM), electrically erasable programmable ROM (EEPROM), flash memory, and/or the like, or any combination of these. Volatile memory 240 can include random access memory (RAM), which can act as external cache memory. RAM can comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs can be located in system storage devices 216, which are in communication with processor unit 204 through system bus 202. In these illustrative examples, the instructions are in a functional form in persistent storage 208. These instructions can be loaded into memory 206 for execution by processor unit 204. Processes of one or more examples described herein can be performed by processor unit 204 using computer-implemented instructions, which can be located in a memory, such as memory 206.

These instructions are referred to as program instructions, program code, computer usable program code, or computer-readable program code executed by a processor in processor unit 204. The program code in the different examples can be embodied as one or more storage areas on different physical or computer-readable storage media, such as memory 206 or persistent storage 208. Program code 218 can be located in a functional form on computer-readable media 220 that is selectively removable and can be loaded onto or transferred to data processing system 200 for execution by processor unit 204. Program code 218 and computer-readable media 220 form computer program product 222 in these examples. In one example, computer-readable media 220 can comprise computer-readable storage media 224 or computer-readable signal media 226.

Computer-readable storage media 224 can include, for example, an optical or magnetic disk that is inserted or placed into a drive or other device that is part of persistent storage 208 for transfer onto a storage device, such as a hard drive, that is part of persistent storage 208. Computer-readable storage media 224 also can take the form of a persistent storage, such as a hard drive, a thumb drive, or a flash memory, that is connected to data processing system 200. Computer-readable storage media 224 can be configured to be removable from data processing system 200, or can be configured to not be removable from the data processing system.

Computer-readable storage media 224 can be a non-transitory, physical or tangible storage device used to store program code 218 rather than a medium that propagates or transmits program code 218. In this case, computer-readable storage media 224 is also referred to as a computer-readable tangible storage device or a computer-readable physical storage device. In other words, computer-readable storage media 224 is media that can be touched by a person.

Alternatively, program code 218 can be transferred to data processing system 200, e.g., remotely over a network, using computer-readable signal media 226. Computer-readable signal media 226 can be, for example, a propagated data signal containing program code 218. For example, computer-readable signal media 226 can be an electromagnetic signal, an optical signal, and/or any other suitable type of signal. These signals can be transmitted over communications links, such as wireless communications links, optical fiber cable, coaxial cable, a wire, and/or any other suitable type of communications link. In other words, the communications link and/or the connection can be physical or wireless in the illustrative examples.

Program code 218 can be downloaded over a network to persistent storage 208 from another device or data processing system through computer-readable signal media 226 for use within data processing system 200. For instance, program code stored in a computer-readable storage medium in a server data processing system can be downloaded over a network from the server to data processing system 200. The one or more computers providing program code 218 can include one or a combination of a server computer, a client computer, or some other device capable of storing and transmitting program code 218.

Program code 218 can comprise an operating system (OS) 250. Operating system 250, which can be stored on persistent storage 208, controls and allocates resources of data processing system 200. One or more applications 252 take advantage of the operating system's management of resources via program modules 254, and program data 256 stored on system storage devices 216. OS 250 can include any suitable software system configured to manage and expose hardware resources of computer 200 for sharing and use by applications 252. OS 250 can provide application programming interfaces (APIs) that facilitate connection of different type of hardware and/or provide applications 252 access to hardware and OS services. Certain applications 252 can provide further services for use by other applications 252, e.g., as is the case with so-called "middleware." Aspects of the vehicle network system described above can be implemented with respect to various operating systems or combinations of operating systems.

The different components illustrated for data processing system 200 are not meant to provide architectural limitations to the manner in which different examples can be implemented. One or more examples of the present disclosure can be implemented in a data processing system that includes fewer components or includes components in addition to and/or in place of those illustrated for computer 200. Other components shown in FIG. 3 can be varied from the examples depicted. Different examples can be implemented using any hardware device or system capable of running program code. As one example, data processing system 200 can include organic components integrated with inorganic components and/or can be comprised entirely of organic components (excluding a human being). For example, a storage device can be comprised of an organic semiconductor.

Processor unit 204 can take the form of a hardware unit having hardware circuits that are specifically manufactured or configured for a particular use, or to produce a particular outcome or progress. This type of hardware can perform operations without needing program code 218 to be loaded into a memory from a storage device to be configured to perform the operations. For example, processor unit 204 can be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and can be reconfigured at a later time. Examples of programmable logic devices include, a programmable logic array, a field programmable logic array, a field programmable gate array (FPGA), and other suitable hardware devices. With this type of implementation, executable instructions (e.g., program code 218) can be implemented as hardware, e.g., by specifying an FPGA configuration using a hardware description language (HDL) and then using a resulting binary file to (re)configure the FPGA.

In another example, data processing system 200 can be implemented as an FPGA-based (or in some cases ASIC-based), dedicated-purpose set of state machines (e.g., Finite State Machines (FSM)), which can allow critical tasks to be isolated and run on custom hardware. Whereas a processor such as a CPU can be described as a shared-use, general purpose state machine that executes instructions provided to it, FPGA-based state machine(s) are constructed for a special purpose, and can execute hardware-coded logic without sharing resources. Such systems are often utilized for safety-related and mission-critical tasks.

In still another illustrative example, processor unit 204 can be implemented using a combination of processors found in computers and hardware units. Processor unit 204 can have a number of hardware units and a number of processors that are configured to run program code 218. With this depicted example, some of the processes can be implemented in the number of hardware units, while other processes can be implemented in the number of processors.

In another example, system bus 202 can comprise one or more buses, such as a system bus or an input/output bus. Of course, the bus system can be implemented using any suitable type of architecture that provides for a transfer of data between different components or devices attached to the bus system. System bus 202 can include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 210 can include a number of devices that transmit data, receive data, or both transmit and receive data. Communications unit 210 can be, for example, a modem or a network adapter, two network adapters, or some combination thereof. Further, a memory can be, for example, memory 206, or a cache, such as that found in an interface and memory controller hub that can be present in system bus 202.

The flowcharts and block diagrams described herein illustrate the architecture, functionality, and operation of possible implementations of systems, methods, and computer program products according to various illustrative examples. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

C. Illustrative Vehicle Network System

Figure 4:
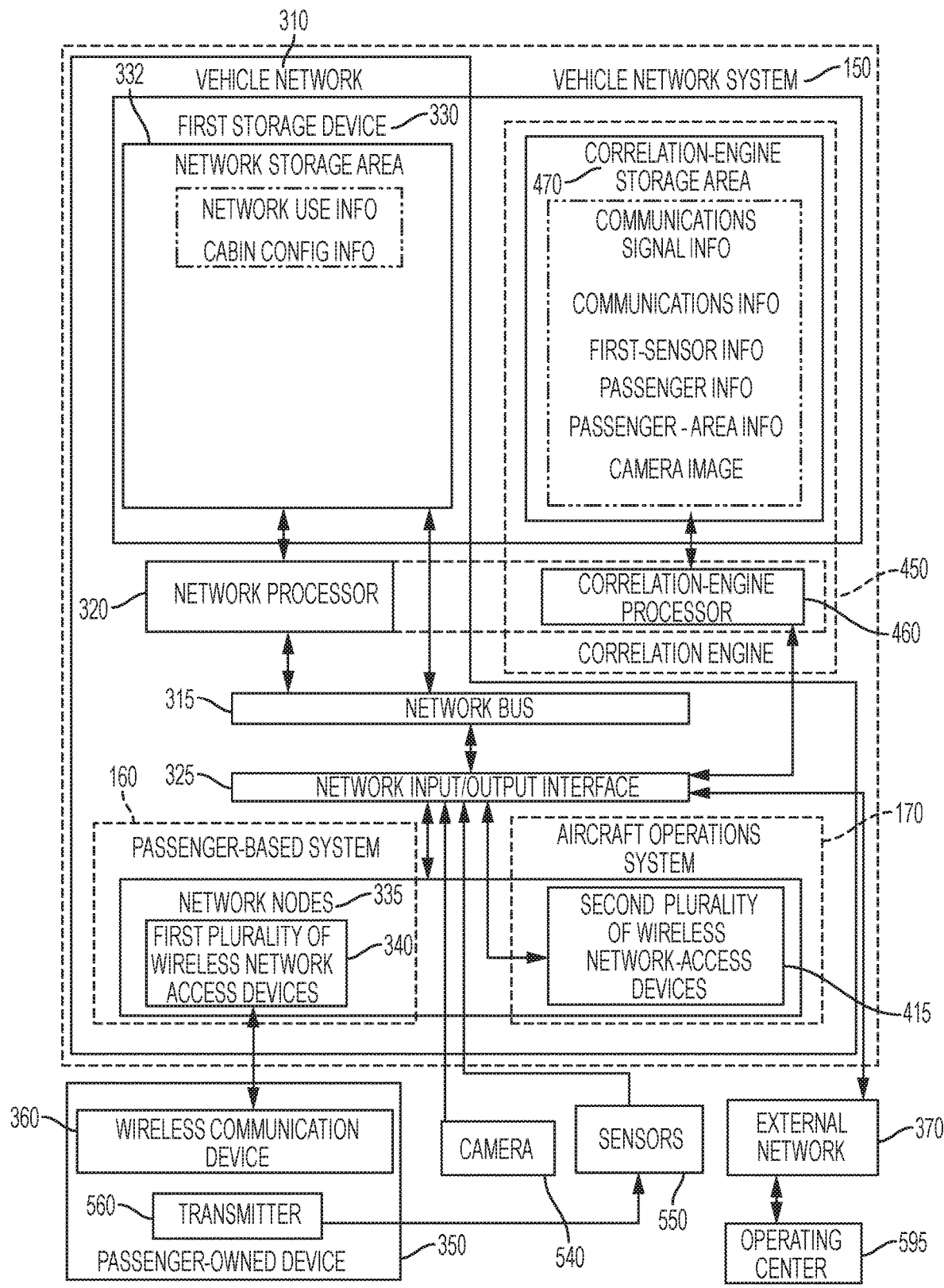
FIG. 4 is a schematic diagram of an illustrative vehicle network system.

This section describes an illustrative vehicle network system 150, as shown in FIG. 4. Vehicle network system 150 is an example of a vehicle network system configured to relate unauthorized data intrusions to a passenger-owned device, as described above. Vehicle network system 150 can be included on aircraft 120 and/or any other suitable example of vehicle 121.

Vehicle network system 150 includes a vehicle network 310. Vehicle network 310 comprises a medium configured to provide communication links between various devices within vehicle network system 150. Devices connected to vehicle network 310 can include one or more data processing systems that are examples of data processing system 200, described above. Vehicle network 310 can include connections such as wired or wireless communication links, fiber optic cables, and/or any other suitable medium for transmitting and/or communicating data between devices on the vehicle network.

Vehicle network 310 includes a network bus 315 (also referred to as a network communications framework). Network bus 315 is connected to a network processor 320, a network input/output interface 325, and at least a first storage device 330. Network bus 315 is configured to facilitate communications (e.g., data transmission) between network processor 320, input/output interface 325, first storage device 330, and/or any other suitable network devices.

Network processor 320 comprises one or more processors configured to execute instructions. Network processor 320 is typically an example of processor unit 204, described above.

First storage device 330 can include any suitable hardware or combination of hardware capable of storing information (e.g., digital information), such as data, program code in functional form, and/or other suitable information, either on a temporary basis or a permanent basis. First storage device 330 may also be referred to as a computer-readable storage device including a computer-readable medium, and can include one or a combination of a volatile memory, a non-volatile memory, a persistent storage device, and/or a non-persistent storage device. First storage device 330 can comprise one or more components or devices. For example, first storage device 330 can include a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more components of first storage device 330 can be removable and/or portable, e.g., a removable hard drive. Additionally, or alternatively, first storage device 330 can comprise an optical disk drive such as a compact disk ROM device (CD-ROM), CD recordable drive (CD-R drive), CD rewritable drive (CD-RW drive), and/or a digital versatile disk ROM drive (DVD-ROM). First storage device 330 can further include a removable or non-removable interface configured to connect the first storage device, or components thereof, to network bus 315. First storage device 330 can include a network storage area 332 for storage of network-related information.

Network processor 320 and first storage device 330 may for example be components of a data processing system 200 that services passenger-based system 160, and may also service one or more other systems, such as aircraft operations system 170.

Network input/output interface 325 is configured to facilitate input and output (e.g., reception and transmission) of data between network bus 315 and other devices connected to vehicle network 310. Network input/output interface 325 can comprise, e.g., one or more switches, routers, hubs, gateways, repeaters, bridges, bridge routers, protocol converters, modulators, modems, and/or any other suitable hardware and/or software.

Network input/output interface 325 is connected (e.g., by wired and/or wireless communication links) to a plurality of network nodes 335 each configured to receive, create, store, and/or transmit data. Network nodes 335 include at least a first plurality of wireless network-access devices 340. Wireless network-access devices 340 can comprise any suitable hardware configured to connect one or more devices having wireless communications circuits to vehicle network 310 (e.g., to network input/output interface 325 of vehicle network 310). For example, wireless network-access device 340 can include one or more wireless access points. Additionally, or alternatively, wireless network-access devices 340 can comprise one or more routers and/or modems.

Wireless network-access devices 340 can provide access to vehicle network 310 to one or more passenger-owned devices 350. Passenger-owned devices 350 can be smart phones, computers, laptop computers, tablets, and/or any other suitable electronic devices capable of wireless communications. Typically, passenger-owned device 350 is an example of data processing system 200. Passenger-owned device 350 is associated with a specific passenger of the vehicle (e.g., aircraft 120). For example, passenger-owned device 350 can be the personal property of the passenger, or can be a device rented by the passenger assigned to the passenger by an employer, and/or the like. Passenger-owned device 350 can be a device provided by an operator of the vehicle (or other entity associated with the vehicle) and associated with a specific passenger for a period of time (e.g., while the passenger is on board the vehicle).

Passenger-owned device 350 has a wireless communication device 360 configured to facilitate communications with data processing systems or devices. For example, wireless communication device 360 can be an example of communications unit 210 of data processing system 200. Wireless communication device 360 can connect to vehicle network 310 through at least one wireless network-access device 340, thereby enabling passenger-owned device 350 to communicate with the vehicle network. When wireless communication device 360 is connected to vehicle network 310, passenger-owned device 350 may be referred to as being on the network, connected to the network, and/or networked.

Once passenger-owned device 350 is connected to vehicle network 310, it can send and receive data communications over the network. In a typical example, passenger-owned device 350 sends a communication to one of first plurality of network-access devices 340, which in turn sends the communication to network input/output interface 325. In some examples, the network-access device that received the communication directly from passenger-owned device 350 sends the communication to another network node 335, which can send the communication to yet another network node and/or to network input/output interface 325. This may be the case if, e.g., network-access devices 340 are distributed throughout an area that is larger than the typical range of the network-access devices. In this situation, passenger-owned device 350 can send a communication to a nearby network-access device 340, and the communication can be routed through one or more additional network nodes 335 to arrive at network input/output interface 325.

After a communication is received at network input/output interface 325, the interface can send the communication to an external network 370 (e.g., the Internet). Alternatively, or additionally, network input/output interface 325 can send the communication to another portion of vehicle network 310, such as an in-flight entertainment system (IFE). Similarly, data communications originating on external network 370 or another portion of vehicle network 310 can be received by network input/output interface 325, and sent by the network input/output interface to one or more wireless network-access devices 340, and sent by the wireless network-access device(s) to passenger-owned device 350.

Typically, vehicle network 310 includes portions (e.g., devices, communication links, and/or the like) that passengers are authorized to access, as well as portions that passengers are not ordinarily authorized to access. For example, vehicle network 310 can include passenger-based system 160 including devices, media, and communication links that passengers are authorized to use. Passenger-based system 160 includes first plurality of wireless network-access devices 340 and can also include, e.g., additional network nodes and/or devices configured to connect passenger-owned device 350 to external network 370. Additionally, or alternatively, components of passenger-based system 160 can be configured to enable a passenger to use passenger-owned device 350 to access in-flight entertainment options (e.g., to stream or download movies or music stored within vehicle network 310), order food or drink, request assistance from vehicle staff, obtain a status update on the vehicle (such as a location, speed, and/or estimated time of arrival), and/or the like.

Vehicle network 310 can also include aircraft operations system 170, which passengers are not authorized to access (e.g., that is restricted). Aircraft operations system 170 can include network devices, communication links, and/or a subset of network nodes 335 (such as a second plurality of wireless-access devices 415) that are reserved for use by systems and/or employees of the aircraft. For example, aircraft operations system 170 can be configured to operate HVAC devices, activate safety equipment (e.g., oxygen masks, fire suppression systems, and/or the like), to provide human-perceptible information to passengers (e.g., fire alarms, signals directing passengers to wear safety belts, and/or the like), and/or to perform any other function that is typically restricted to authorized vehicle personnel. Additionally, or alternatively, aircraft operations system 170 can include, or provide access to, systems associated with aircraft controls, such as primary controls, secondary controls, autopilot systems, envelope protection systems, thrust asymmetry compensation systems, and/or the like. Although illustrative aircraft operations system 170 is described here in connection with an aircraft (e.g., aircraft 120), vehicle network 310 on any suitable type of vehicle 121 can include a vehicle operations system similar to aircraft operations system 170 or other system applicable to the particular vehicle.

It is highly desirable to deter unauthorized communications (e.g., intrusions) by passenger-owned devices 350 onto restricted areas of vehicle network 310, such as aircraft operations system 170. Accordingly, vehicle network system 150 includes systems configured to detect an unauthorized intrusion on vehicle network 310 and to associate the detected intrusion with a specific passenger-owned device 350 responsible for the intrusion.

Network processor 320 is configured to detect unauthorized intrusions on vehicle network 310. For example, network processor 320 can be configured to obtain identifying information, such as a media access control address (MAC address) or other unique identifier, for each device in communication with a restricted part of vehicle network 310, and to compare the identifying information against a list of devices authorized to communicate with the restricted part of the network. Data communications to or from any device communicating with the restricted part of the network, but not appearing on the list of authorized devices, can then be identified as an unauthorized intrusion. The restricted part of the network can be, for example, second plurality of wireless devices 415, and/or any other component of aircraft operations system 170.

Additionally, or alternatively, network processor 320 can be configured to recognize certain data patterns as malicious (e.g., as corresponding to instructions to bypass network security, to edit and/or delete restricted files, to change user account settings, to change and/or guess passwords, to change file access permissions, to install and/or modify executable instructions, and/or the like) and to identify communications containing these patterns as intrusions.

Network processor 320 can be configured to identify some types of suspicious network behavior to be treated as an unauthorized data intrusion even if the suspicious behavior does not result in unauthorized access to a restricted portion of the network. For example, an unsuccessful attempt to access a restricted portion of the network can be identified as an unauthorized intrusion.

Typically, network processor 320 is further configured to determine information about the detected unauthorized intrusion (e.g., information regarding a communication signal associated with the detected unauthorized intrusion). Information associated with the intrusion can include relative and/or absolute timing information associated with transmission and/or reception of the intruding communication at one or more portions of the network. For example, network processor 320 can be configured to determine a time (e.g., a timestamp) at which the intruding communication was transmitted by the intruding passenger-owned device 350, a time at which the intruding communication was received and/or re-transmitted by a network-access device 340, a time interval between transmission and reception of the intruding communication, and/or any other suitable timing-related information. Additionally, or alternatively, information associated with the intrusion can include information about a frequency and/or channel used to send and/or receive the intrusion, and/or information identifying one or more network nodes 335 used to send and/or receive the intrusion.

Additionally, or alternatively, information associated with the intrusion can include information indicating a characteristic of the passenger-owned device from which the intrusion originated. For example, network processor 320 can be configured to detect formatting information of the intruding communication, protocol information associated with transmission and/or reception of the intruding communication, and/or any other suitable metadata associated with the intrusion that can indicate a characteristic of the intruding passenger-owned device. Example device characteristics that can be indicated by this information can include a device type (e.g., laptop, smartphone, etc.), manufacturer, operating system, application, and/or any other suitable device property.

Information about the intrusion can be used to identify the specific passenger-owned device 350 that sent and/or received the intruding communication. For example, the intruding passenger-owned device 350 can be identified based on correlations between information about the intrusion and information about communications within vehicle network 310. The identification can be performed by network processor 320.

Additionally, or alternatively, the identification can be performed by a correlation engine 450 of vehicle network system 150. Correlation engine 450 comprises a correlation-engine processor 460 and a correlation-engine storage area 470. Correlation-engine processor 460 comprises one or more processors configured to execute instructions, and is typically an example of processor unit 204 described above. Correlation-engine processor 460 and network processor 320 can be the same processor and/or can both be part of a same data processing system. It will be understood, then, that correlation engine 450 can be included in vehicle network 310, in which case the description of correlation engine 450 applies to vehicle network 310.

Correlation-engine storage area 470 is typically a storage area of (e.g., a portion of) first storage device 330, but the correlation-engine storage area can alternatively or additionally be disposed on one or more other storage devices. Correlation-engine processor 460 and correlation-engine storage area 470 can each be disposed entirely on the vehicle, entirely separately from the vehicle, or partially on the vehicle and partially in a separately location.

Correlation-engine processor 460 is configured to store on correlation-engine storage area 470 communications information representative of data communications occurring on network bus 315. The communications information, which may also be referred to as network-use information, can include, e.g., information about the type of data and/or amount of data being transferred between devices and/or nodes 335 on vehicle network 310. Typically, the communications information includes information that is unique to each passenger-owned device 350 on vehicle network 310.

For example, the communications information can associate communications sent by and/or communications sent to each passenger-owned device 350 with a respective identifier (e.g., an IP address, MAC address, and/or any other suitable identifying information) that uniquely identifies the passenger-owned device. The communications information can include timing information about when data was received at and/or sent from various parts of vehicle network 310.

Correlation-engine processor 460 is further configured to receive from network processor 320 information associated with a detected unauthorized network intrusion, and to identify the passenger-owned device 350 that performed the intrusion. The intruding device is identified based at least in part on the stored communications information described above, and can additionally or alternatively be based on other information. The following paragraphs describe, without limitation, example systems for identifying the passenger-owned device 350 that performed the detected intrusion. In some examples, several systems for identifying the intruding passenger-owned device 350 are used, even though use of the several systems may appear redundant, in order to provide nonrepudiation.

a. Unique Code

Vehicle network system 150 can be configured to require that a security application be installed on passenger-owned device 350 in order for the passenger-owned device to be authorized to access vehicle network 310 (e.g., passenger-based system 160 of the vehicle network). The security application can be configured to assign a unique code (e.g., a binary and/or alphanumeric string) to the passenger-owned device 350 on which it is installed and to associate the unique code with communications by the passenger-owned device on vehicle network 310. For example, all data packets and/or other transmissions sent by passenger-owned device 350 can include the unique code. Accordingly, any unauthorized intrusion on vehicle network 310 includes the unique code corresponding to the passenger-owned device 350 on which the intrusion originated, unless the security application is circumvented. Correlation-engine processor 460 can be configured to obtain the code associated with the intrusion from the information received from network processor 320 about the intrusion, and the passenger-owned device 350 that performed the revision can be identified based on the unique code.

The unique code can be generated by a mathematical operation, such as a cryptographic hash function (e.g., SHA-256 and/or another suitable function). The input of the function can be any suitable number associated with passenger-owned device 350, such as a serial number, MAC address, and/or the like. The input can alternatively, or additionally, comprise a number associated with the passenger who owns the device, such as a ticket number, seat number, and/or the like.

b. Assigned Channel/Frequency

Vehicle network 310 can be configured to communicate with passenger-owned devices 350 over any one of a plurality of channels. Each one of the channels can be defined, e.g., by a unique frequency, modulation, and/or any other suitable property. Vehicle network 310 and/or correlation-engine processor 460 can be configured to assign a respective one of the channels to each passenger-owned device 350, such that each passenger-owned device communicates with the vehicle network over that channel. The information obtained by network processor 320 about a detected intrusion can include identification of the channel over which the detected intrusion was sent and/or received. Accordingly, it can be inferred that the passenger-owned device 350 responsible for the intrusion is the device, or one of the plurality of devices, that was assigned to the identified channel. Each passenger-owned device 350 can be assigned to a respective one of the channels by, e.g., a security application (which can be the same application as described above with reference to unique codes).

In some examples, the number of available channels can be equal to, or greater than, the number of passenger-owned devices 350 connected to vehicle network 310 at any given time. Accordingly, in these examples, identifying the channel associated with the detected intrusion can uniquely identify the intruding passenger-owned device 350. In other examples, however, it is not practical to provide such a large number of available channels. Accordingly, in these examples, more than one passenger-owned device 350 is assigned to each of the channels, and identifying the channel associated with the intrusion identifies a subset of passenger-owned devices that may be responsible for the intrusion.

Each passenger-owned device 350 can be assigned one of the channels randomly, based on a characteristic of the device (e.g., device type), based on the position of the passenger's assigned seat within the vehicle, and/or by any other suitable method. In examples wherein more than one passenger-owned device 350 is assigned to each one of the channels, the devices can be assigned based on passenger seat positions, such that devices assigned to each channel are spaced apart in the vehicle from other devices assigned to the same channel. As described below, some systems for identifying intruding passenger-owned devices 350 can be based on the position of the passenger-owned device within the vehicle. Spatially separating devices assigned to the same channel can therefore help to ensure that identification approaches based on passenger position and identification approaches based on assigned channel do not provide redundant information. For example, if a position-based identification approach indicates that the intruding device is located in a specific row of seats in the vehicle, and the devices belonging to passengers in that row are all assigned to different channels, then it may be possible to identify the intruding device. In contrast, if all devices belonging to passengers seated in that row are assigned to the same channel, then information about the assigned channel corresponding to the intrusion will not help to identify the intruding device.

c. Position-Based Information

Correlation-engine processor 460 can be further configured to store (e.g., on correlation-engine storage area 470) communication-signal information for at least one network-access device of first plurality of network-access devices 340. The communication-signal information comprises information about communications received by the selected network-access device(s) 340 from passenger-owned devices 350. Typically, the communication-signal information is obtained for network-access devices 340 that received and/or transmitted communications associated with the intrusion. The relevant network-access devices can be identified, e.g., based on intrusion information obtained by network processor 320 and shared with correlation-engine processor 460.

Network-access devices 340 each typically have a limited spatial range within which they are capable of communicating with passenger-owned device 350. Accordingly, communication-signal information for network-access devices 340 known to have sent and/or received the intrusion communication can be combined with other communication information to identify a position or region within the vehicle of the passenger operating the intruding device.

Figure 5:
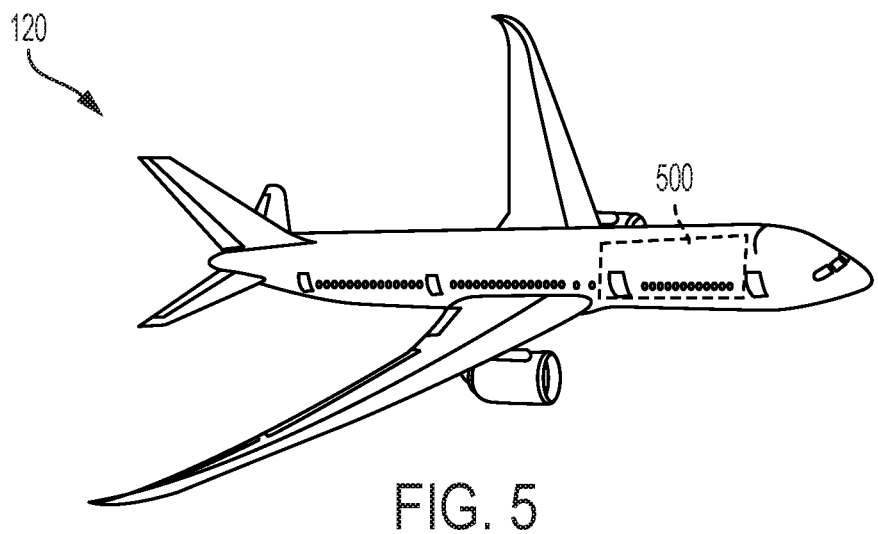
FIG. 5 is an isometric view of an aircraft including an illustrative passenger area.
Figure 6:
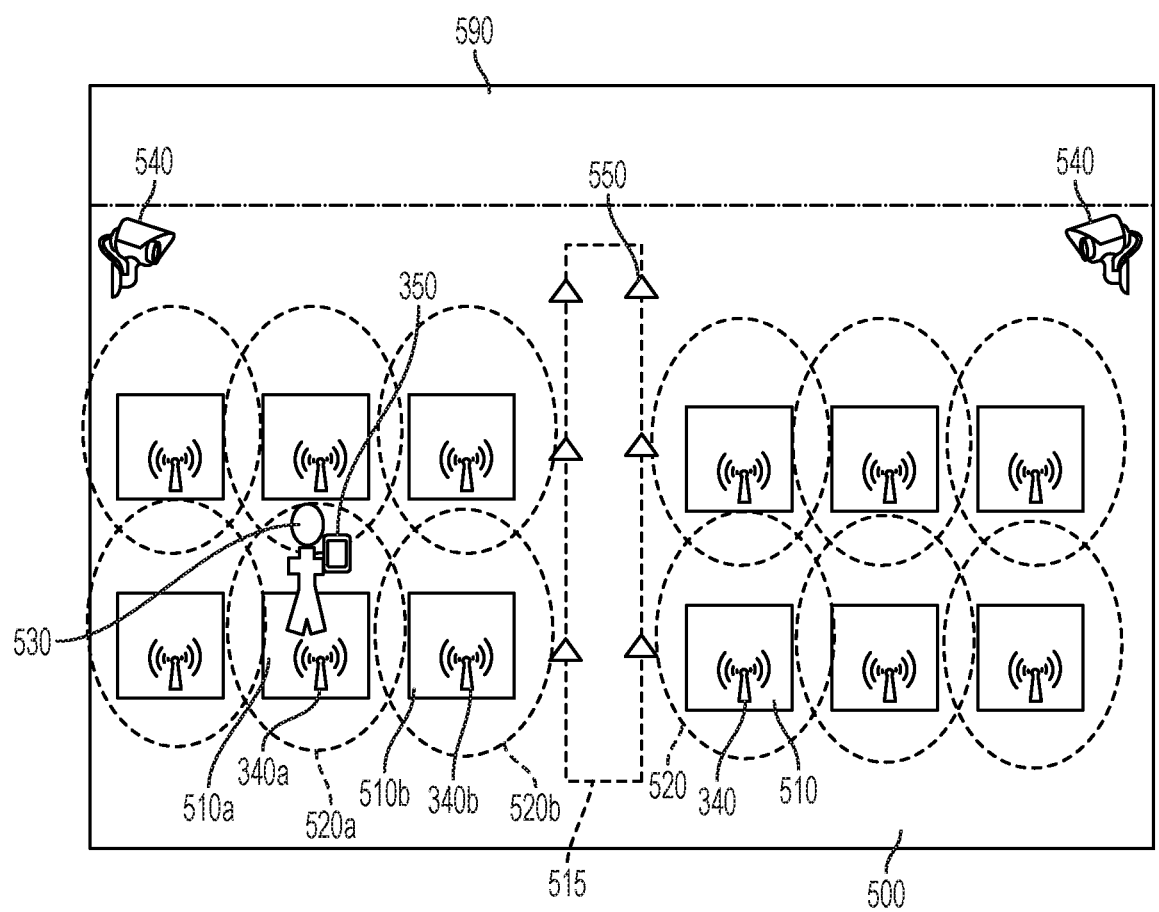
FIG. 6 is a schematic diagram of the aircraft passenger area of FIG. 5.

FIGS. 5-6 schematically depict an illustrative passenger cabin 500 of aircraft 120. Cabin 500, which may also be referred to as a passenger area, can comprise any vehicle area configured to contain passengers under normal operating conditions. Although cabin 500 is described in this example as an aircraft cabin, cabin 500 can be a passenger area of any suitable vehicle 121.

FIG. 5 depicts an example location of cabin 500 within aircraft 120, and FIG. 6 depicts an arrangement of rows of passenger seats 510 within the cabin. At least one aisle 515 provides space for passengers and crew to move through the cabin.

Wireless network-access devices 340 are distributed through cabin 500 to provide network access to passengers. In the example depicted in FIG. 6, one network-access device 340 is disposed at each seat 510. In other examples, network-access devices 340 can be distributed differently. For example, one network-access device 340 can be disposed between seats 510, at every other seat, at each row, at every other row, or in any other suitable configuration.

Each network-access device 340 has a range 520, depicted in dotted lines in FIG. 6. Range 520 defines a three-dimensional spatial region within which network-access device 340 can connect to another device (e.g., passenger-owned device 350) in a satisfactory way. Communications with a device outside of range 520 may be unreliable and/or impossible. In FIG. 6, a passenger 530 is seated in seat 510a, within range 520a of network-access device 340a. Accordingly, passenger-owned device 350 owned by passenger 530 connects to vehicle network 310 via network-access device 340a. A communication sent from passenger-owned device 350 to network-access device 340a can, as described previously, be routed through (e.g., can traverse) one or more other network-access devices (e.g. network-access device 340b) and/or other network nodes 335 before arriving at network input/output interface 325.

As described above, network processor 320 is configured to store information about communications sent by passenger-owned device 350 on vehicle network 310. The communications information typically includes information about which network-access device 340 was used to connect passenger-owned device 350 to vehicle network 310, and/or otherwise was traversed by communications from the passenger-owned device. Because each network-access device 340 is correlated with a region within cabin 500, information identifying the network-access device includes information about the position or possible positions of passenger-owned device 350. After an unauthorized intrusion on vehicle network 310 has been detected, communication-signal information for one or more network-access devices 340 can be used to determine a position or region within cabin 500 of a passenger likely to be responsible for the intrusion. Information about the intrusion and the network-access devices 340 used to send the intrusion can be correlated with information about passenger positions within cabin 500 to determine at least one passenger position (e.g., a seat 510) that may be associated with the intrusion. Network processor 320 and/or correlation-engine processor 460 can be configured to store passenger-cabin configuration information relating seat locations to locations of network-access devices 340, which can help to facilitate determination of the passenger position associated with the intrusion.

Preferably, information about passenger positions within cabin 500 is associated with information identifying the passengers. For example, the name of each passenger can be associated with a seat number assigned to the passenger. This is typically the case, for example, in passenger aircraft. In these examples, correlation-engine processor 460 can be configured to store on correlation-engine storage area 470 passenger-related information including a passenger name and assigned position for each passenger. The assigned position can comprise a seat number, a seat row, and/or a cabin or cabin section (e.g., first-class section, general seating section, level, deck, and/or any other suitable information identifying a portion of the vehicle).

A plurality of cameras 540 can be positioned within cabin 500. Typically, cameras 540 are distributed throughout cabin 500 such that all portions of the cabin, and/or all likely passenger positions (e.g., all seats 510), can be imaged by at least one camera. Correlation-engine processor 460 can be configured to store (e.g., on correlation-engine storage area 470, and/or any other suitable location) images of passenger positions within cabin 500. After one or more passenger positions associated with a detected intrusion have been determined, correlation-engine processor 460 can associate the determined positions with one or more stored camera images of the determined positions. Typically, the determined positions are associated with stored camera images that were taken at or near the time when the communication associated with the intrusion was received by network-access device or devices 340 proximate the determined positions. Camera images of the determined positions taken at this time can be expected to include images of the passenger responsible for the intrusion, which may facilitate identification and/or apprehension of the responsible passenger.

As shown in FIG. 6, a plurality of sensors 550 can be distributed in predetermined locations throughout cabin 500. Each sensor is configured to detect a signal emitted by passenger-owned device 350. The signal emitted by passenger-owned device 350 can be a signal emitted by a transmitter 560 of the passenger-owned device. Transmitter 560 can be any suitable device, other than wireless communication device 360, that is configured to emit a signal detectable by sensor 550. For example, transmitter 560 can be an RF transmitter (e.g., a Bluetooth transmitter, a near-field communication transmitter, and/or the like). A security application installed on passenger-owned device 350 can be configured to transmit a signal from transmitter 560 that is detectable by sensor 550. The security application can be configured to assign one or more properties of the signal, such as a frequency, modulation, and/or polarization, to one of a plurality of possible values, such that signals from different passenger-owned devices 350 can be distinguished from each other. For example, the security application can be configured to select one frequency from a plurality of frequencies for use by transmitter 560.

Sensor 550 can be configured to sense information associated with a distance between passenger-owned device 350 and transmitter 560. For example, sensor 550 can be configured to sense a strength of a signal transmitted by transmitter 560. Additionally, or alternatively, sensor 550 can be configured to determine a travel time for a signal sent between transmitter 560 and the sensor. For example, the transmitter signal may include information identifying the time at which the transmitter signal is transmitted, sensor 550 can be configured to determine the time at which the signal is received at the sensor, and the difference between the transmission and reception time can be determined by the sensor, by correlation-engine processor 460, and/or any other suitable device. The time difference (e.g., the travel time) can be used to determine the distance between sensor 550 and transmitter 560, and this distance can be used to at least partially determine a position of passenger-owned device 350. Alternatively, the transmitted signal may be received by a plurality of sensors 550, and location of the transmitter can be determined based the times the different sensors received the same transmitted signal.

Correlation-engine processor 460 can be configured to store in correlation-engine storage area 470 sensor information associated with the signal transmitted by transmitter 560. For example, correlation-engine processor 460 can be configured to receive from one or more sensors 550 information associated with the signal sent by transmitter 560 and received at sensor 550. Correlation-engine processor 460 can be further configured to correlate information about the signal from transmitter 560 with, e.g., communication-signal information for at least one network-access device 340, to determine a position of passenger-owned device 350. The correlation can be based at least in part on additional information such as communications information about network use, passenger-related information including information about passenger positions, and/or any other suitable information.

Sensors 550 can be distributed in any suitable manner throughout cabin 500. In the example depicted in FIG. 6, sensors 550 are positioned in aisle 515 of cabin 500. This distribution of sensors 550 can be beneficial in examples wherein at least some of the aisle lies outside ranges 520 of network-access devices 340, which can limit the ability of the network-access devices to provide information about the location of passenger-owned device 350. However, sensors 550 can also be distributed adjacent network-access devices 350, at each seat 510, uniformly throughout cabin 500, and/or in any other suitable manner.

The communication-signal information stored by correlation-engine processor 460 can include timing information for each of a plurality of network-access devices 340. The timing information includes information about the time at which communications from one or more passenger-owned devices 350 were received by each of the plurality of network-access devices 340. Correlation-engine processor 460 can be configured to determine the location of passenger-owned device 350 (e.g., the position within cabin 500 of the passenger owning the device) using multilateration and/or similar techniques, based at least in part on the communication-signal information relating to network-access devices 340 or signal timing information received by sensors 550, as discussed above. The time required for a communication to travel from passenger-owned device 350 to a network-access device 340 is typically related to the physical distance between the passenger-owned device and the network-access device. Accordingly, the timing information included in the communication-signal information can indicate the physical distance within cabin 500 between a selected passenger-owned device and at least one of the network-access devices. The distance information can be correlated with passenger-position information to help to identify a passenger responsible for an intrusion.

Figure 7:
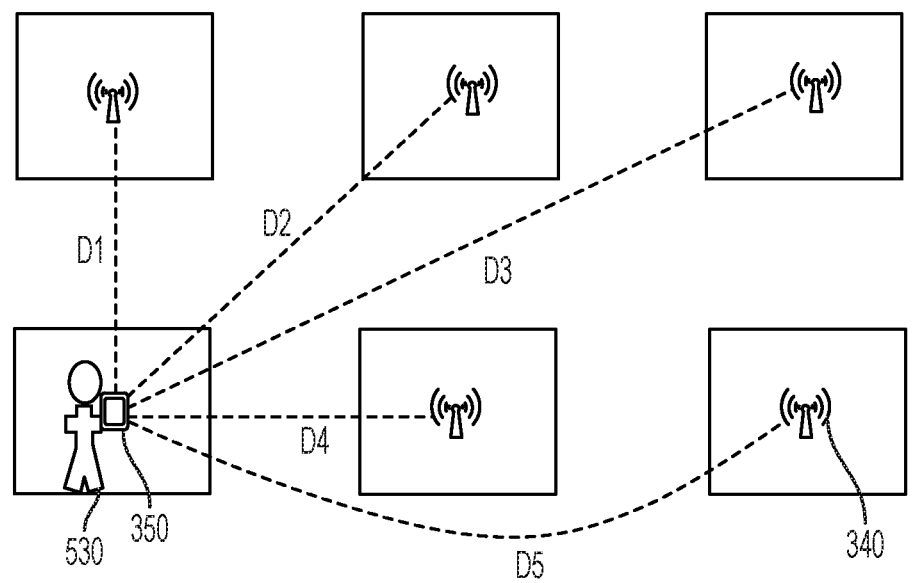
FIG. 7 is a schematic diagram depicting distances within the passenger area that can be used in determining a position of a passenger-owned device.

FIG. 7 schematically depicts distances D1, D2, D3, D4, and D5 between passenger-owned device 350 operated by passenger 530 and each of a plurality of network-access devices 340. The network-access devices 340 can be positioned at different seats 510, as in FIG. 6, or can be positioned at other locations within the vehicle. Each distance can be obtained, at least approximately, based on timing information for the respective network-access device 340. For example, one or more of the network-access devices can be configured to send a signal to passenger-owned device 350, with the signal being configured to cause the passenger-owned device to send a return signal in response. The network-access device can be configured to compute the time elapsed between transmission of the original signal and reception of the return signal. The elapsed time reflects the round-trip travel time between the network-access device and passenger-owned device 350, which reflects the physical distance between the network-access device and the passenger-owned device. A security application installed on passenger-owned device 350 can be configured to cause the passenger-owned device to send the return signal in response to receiving an appropriate signal from network-access device 340.

Additionally, or alternatively, a communication transmitted by passenger-owned device 350 can be received by two or more network-access devices 340, and the difference between the time at which the communication is received at a first network-access device and the time it is received at a second network-access device (e.g., the difference in arrival time of the communication at each device) can provide information about the position of the passenger-owned device. Systems for determining a position, or a region of possible positions, of passenger-owned device 350 based on difference in arrival times at two or more network-access devices 340 can comprise multilateration. In general, the difference in arrival time at two network-access devices determines a plurality of positions at which passenger-owned device 350 could be located. The possible positions are typically defined mathematically by a hyperboloid. In order to narrow down the possible positions of passenger-owned device 350 (e.g., to a single seat 510, a single row, etc.), the communication can be sent to additional network-access devices, and the differences in arrival times between pairs of the network-access devices can indicate a smaller region of space in which the passenger-owned device 350 may be positioned.

The communication for which the differences in arrival time are calculated can be a communication sent by passenger-owned device 350 to a plurality of network-access devices 340 to facilitate multilateration by correlation-engine processor 460. For example, a security application installed on passenger-owned device 350 can be configured to send a communication signal for multilateration, and passengers can be required to install the security application prior to use of vehicle network 310. Alternatively, or additionally, the communication used for multilateration can be a communication sent by passenger-owned device 350 during ordinary passenger network use, such as browsing the Internet via vehicle network 310. Alternatively, or additionally, signals sent by transmitter 560 of passenger-owned device 350 and received by sensors 550 can be used for multilateration and/or related techniques to obtain information related to distances between the passenger-owned device and one or more of the sensors.

The communication-signal information stored by correlation-engine processor 460 can include actual and optional routes through network nodes 335 traversed by the intrusion communication. As described above, a communication transmitted by passenger-owned device 350 traverses one or more of network nodes 335, including at least one network-access device 340, to reach network input/output interface 325. The specific network nodes 335 traversed by the intruding communication can indicate the position or region within cabin 500 of the passenger-owned device 350 that sent the intruding communication.

Figure 8:
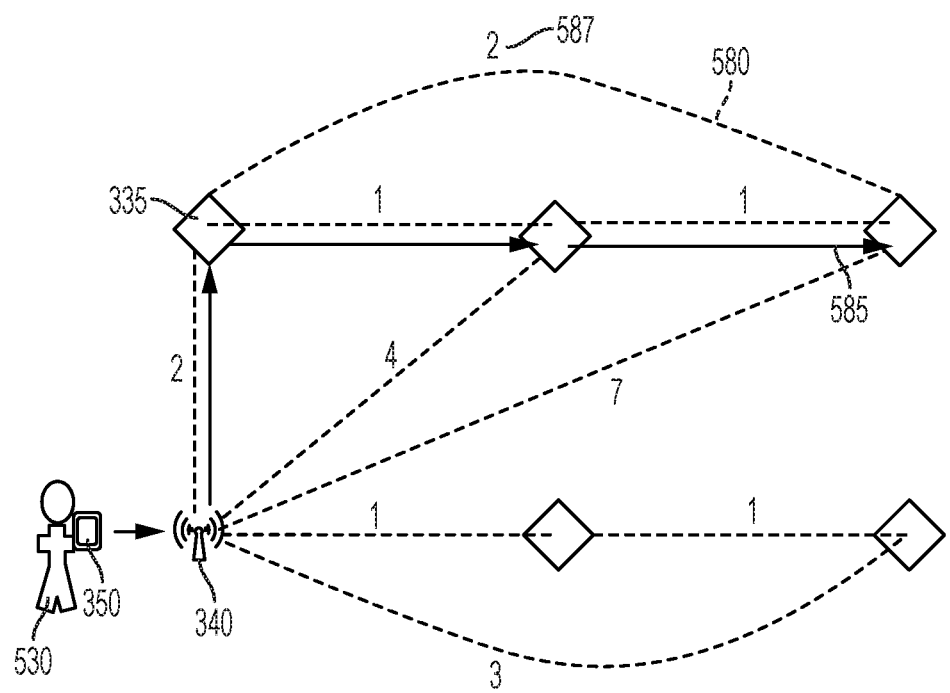
FIG. 8 is a schematic diagram depicting actual and optional routes traversed by a data communication through nodes of a vehicle network.

FIG. 8 depicts illustrative optional routes 580 and actual route 585 traversed by an intrusion signal sent by passenger-owned device 350. In FIG. 8, dashed lines indicate an optional path (e.g., a portion of one of optional routes 580)

between two nodes 335, and solid arrows indicate an actual path (e.g., portions of actual route 585) taken by the intrusion signal between two nodes. Typically network nodes 335 are configured to route a communication to a network destination (e.g., network input/output interface 325) by choosing an efficient route for the communication to traverse through the nodes. The most efficient route through network nodes 335 typically is a route that the communication can traverse in the shortest possible time. Accordingly, in many cases, the most efficient route is the route that includes the lowest number of network nodes 335. Additionally, or alternatively, network nodes 335 can be configured to take into account other network information, such as a distribution of network traffic, an observed delay between one or more pairs of nodes, and/or any other information relevant to efficient travel of a communication through the nodes. A weighting factor 587 can be established between pairs of nodes 335 to aid the nodes in computing an optimal route. For example, a high weighting factor 587 between a pair of nodes 335 can indicate that the delay time between this pair of nodes is relatively long, so the communication will be slowed if it travels along that path. Routing algorithms that account for a weighting factor between nodes 335, and/or a number of nodes traversed by a communication, can be referred to as distance vectoring.

Correlation-engine processor 460 can be configured to use distance vectoring, as described above, to determine a position within the cabin of a passenger operating a passenger-owned device 350 that sent an intruding communication. For example, communication-signal information stored by correlation-engine processor 460 can include optional and actual routes 580 and 585 traversed by the intruding signal, and infer the passenger position based on the assumption that network nodes 335 routed the intrusion signal along an efficient route. In examples in which the communication-signal information includes timing information for at least some of network-access devices 340, correlation-engine processor 460 can be configured to determine the passenger position using distance vectoring in combination with multilateration.

Distance vectoring, multilateration, and/or other suitable techniques can be based on the wireless connection between network nodes 335, such as wireless network access devices 340, wired connections between the network nodes including wired connections between wireless network access devices 340 and network bus 315, or on both the wired and the wireless connections. Since the installed wireless devices can also be connected together via wired networking interfaces as part of the vehicle wiring their physical location and interconnecting non-RF media can also be used for distance-vectoring and multilateration. For example, optional and actual routes 580 and 585 traversed by the intruding signal may include wired connections between network nodes 335 and/or wireless connections between the nodes. As another example, differences in arrival times of a communication signal at two or more network-access devices 340 can be converted into information about the location of the device that sent the communication signal based on information about the wired connection between network-access devices and/or the wireless connection between network-access devices.

Correlation-engine processor 460 and/or any other suitable processor can be configured to track movement of passenger-owned devices 350 through cabin 500. For example, returning to FIG. 6, if communications information indicates that passenger-owned device 350 was connected to vehicle network 310 via network-access device 340a at the time a communication was sent, it can be inferred that the passenger-owned device was positioned at seat 510a at this time. If a subsequent communication was sent with passenger-owned device 350 connected to vehicle network 310 via network-access device 340b, it can be inferred that passenger-owned device 350 had moved to seat 510b. Signals transmitted by transmitter 560 and received by one or more sensors 550 can additionally, or alternatively, indicate a position of passenger-owned device 350. In the example depicted in FIG. 6, the transmitter signals received by sensors 550 can indicate that a passenger is moving up and down aisle 515, and can indicate that a passenger is moving toward a restricted cabin section 590 that passengers are not normally allowed to access.

D. Illustrative Incident Response

After a position of passenger-device 350 that sent an intrusion communication has been determined, one or more passengers associated with the device can be identified. For example, names and/or camera images of passengers suspected to be associated with an intruding communication can be identified based on, e.g., communication information, communication-signal information, and passenger-related information. The names and/or images can be used by security and/or law enforcement entities to find and question the identified passengers. In some cases, security and/or law-enforcement personnel are positioned on the vehicle and can approach the suspected passenger on the vehicle. Additionally, or alternatively, vehicle network system 150 can be configured to transmit the identified names and/or images to an operating center 595 (see FIG. 4), via external network 370 and/or any other suitable communication link. Operating center 595 can comprise any entity suitable for responding to a passenger suspected of unauthorized data intrusions. Operating center 595 can be associated with one or more law-enforcement agencies, government and/or military agencies, security agencies, and/or the like. Alternatively, or additionally, operating center 595 can be a contact point for an organization responsible for the vehicle, such as an airline operating the vehicle, and that organization can contact a law-enforcement agency and/or the like as needed. Vehicle network system 150 can be configured to automatically notify operating center 595 of a suspected intrusion, and to automatically provide operating center 595 with information related to the intrusion. Information related to the intrusion can include, e.g., names and/or camera images of one or more suspected passengers.

In response to receiving information identifying a suspected passenger, operating center 595 can arrange for suitable personnel to board the vehicle and find the suspected passenger, to detain the suspected passenger as they exit the vehicle, and/or take any other suitable action.

E. Illustrative Method for Relating a Data Intrusion on a Vehicle Network to a Vehicle Passenger This section describes steps of an illustrative method 600 for relating a data intrusion on a network of a vehicle to a passenger on the vehicle; see FIG. 9. Aspects of vehicle network system 150 may be utilized in the method steps described below. Where appropriate, reference may be made to components and systems that may be used in carrying out each step. These references are for illustration, and are not intended to limit the possible ways of carrying out any particular step of the method. Reference numbers included in the description of method 600 for objects referred to are to corresponding objects described above with reference to an associated figure.

Figure 9:
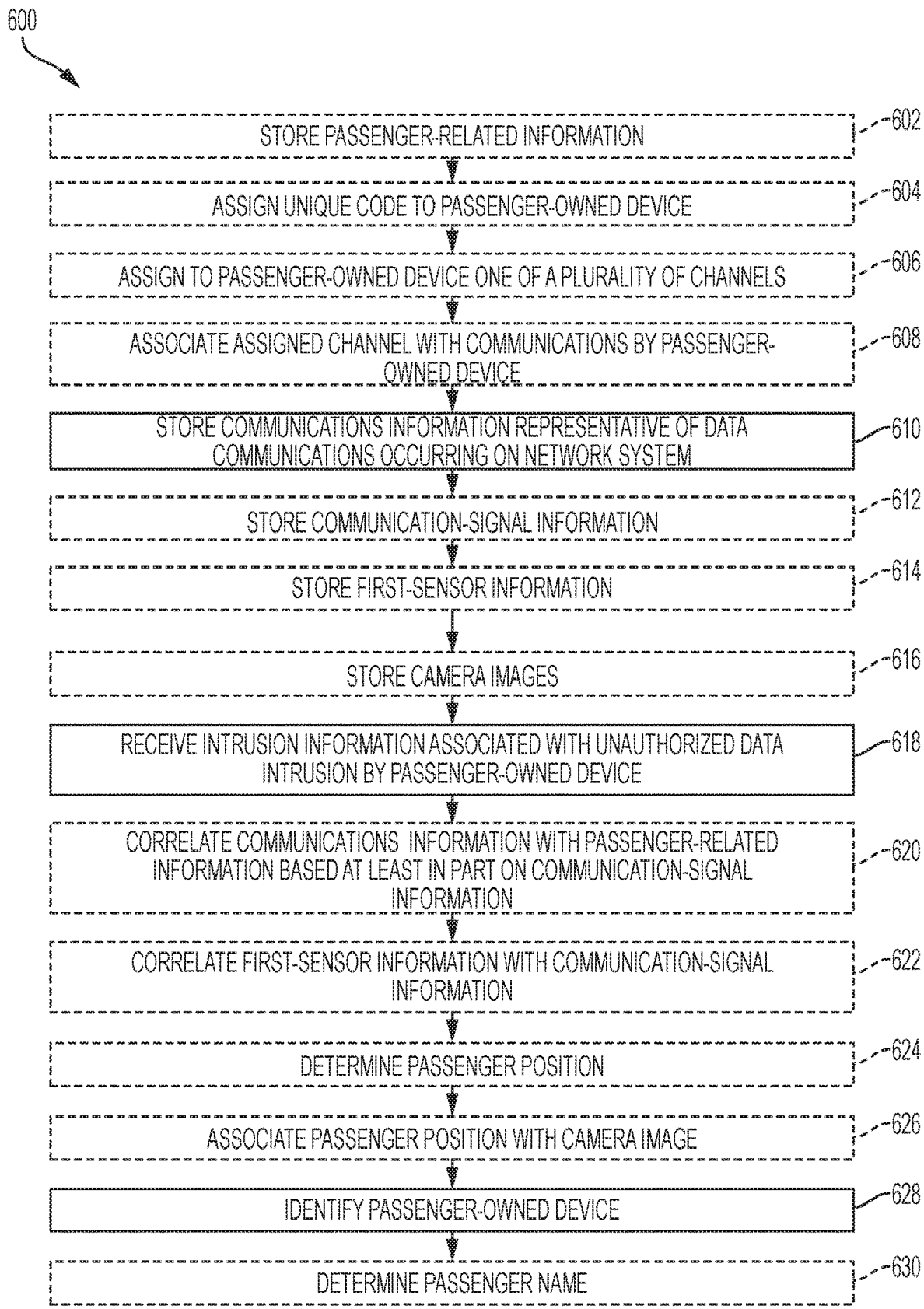
FIG. 9 is a flow diagram depicting steps of an illustrative method for relating a data intrusion on the vehicle network to a passenger on the vehicle.

FIG. 9 is a flowchart illustrating steps performed in an illustrative method. Based on the present disclosure, it should be understood that additional steps may be performed, without departing from the present claims. Although various steps of method 600 are described below and depicted in FIG. 9, the steps need not necessarily all be performed, and in some cases may be performed simultaneously or in a different order than the order shown.

At step 602, method 600 optionally includes storing (e.g., on correlation-engine storage area 470) passenger-related information including a passenger name and a seat assignment for passengers on a vehicle.

At step 604, method 600 optionally includes assigning a unique code to a passenger-owned device (e.g., passenger-owned device 350) associated with a vehicle passenger. The unique code can be assigned to the passenger-owned device by, e.g., a security application that passengers are required install prior to receiving access to a network of the vehicle. The unique code can be associated with communications made by the passenger-owned device on the network.

At step 606, method 600 optionally includes assigning the passenger-owned device to one of a plurality of channels over which the passenger-owned device can communicate with the vehicle network. The channels of the plurality of channels are distinguishable from each other. For example, each channel can have a different frequency. At step 608, method 600 optionally includes associating communications made by the passenger-owned device on the network with the assigned channel. For example, a processor of the network (e.g., network processor 320 and/or correlation-engine processor 460) can store, for each communication on the network, information about which channel was used to transmit the communication.

At step 610, method 600 includes storing (e.g., on correlation-engine storage area 470), communications information representative of data communications occurring on the network system. The data communications include information that is unique to the passenger-owned device that sent the communications, such as a unique code assigned in step 604.

At step 612, method 600 optionally includes storing communication-signal information for at least one network-access device (e.g., network-access device 340) of a plurality of network-access devices distributed in a passenger area of the vehicle. The network-access devices are accessible by a passenger using a passenger-owned device having a corresponding wireless communication component or device. The communication-signal information for at least one network-access device includes information about communications received by the at least one network-access device from the passenger-owned device.

At step 614, method 600 optionally includes storing (e.g., in correlation-engine storage area 470) sensor information associated with a signal received by at least one of a plurality of sensors distributed at predetermined locations throughout the passenger area. The signal is received by at least one of the sensors after having been transmitted by a transmitter on the passenger-owned device. The transmitter on the passenger-owned device that sends the signal received by the sensors is not the wireless communication device of the passenger-owned device.

At step 616, method 600 optionally includes storing camera images of passenger positions in the passenger area. The images are captured by cameras distributed about the passenger area. The passenger positions include locations throughout the passenger area where passengers may be positioned (e.g., passenger seats). The camera images can include photographs, videos, and/or video frames.

At step 618, method 600 includes receiving (e.g., from network processor 320), intrusion information associated with a detected unauthorized data intrusion on the vehicle network by a passenger-owned device communicating wirelessly with the vehicle network system through at least one of the network-access devices. The unauthorized intrusion can be detected by, e.g., the network processor. The intrusion information associated with the detected intrusion can include information regarding a communication signal associated with the detected intrusion.

At step 620, method 600 optionally includes correlating communications information associated with a passenger-owned device with passenger-related information of a passenger based at least in part on the communication-signal information stored at step 612. The passenger-related information includes passenger positions within the passenger area (e.g., an assigned seat number). The passenger-owned device for which the correlation is performed can be a passenger-owned device associated with the detected intrusion, so that the correlation of the communication information with the passenger-related information produces passenger-related information about a passenger who may be responsible for the intrusion.

At step 622, method 600 optionally includes correlating sensor information stored at step 614 with the communication-signal information stored at step 612, based at least in part on the communications information and the passenger-related information.

At step 624, method 600 optionally includes determining at least one passenger position based at least on the correlation of the communications information associated with the passenger-owned device with passenger-related information performed at step 620. The determination can additionally be based on the correlation performed at step 622. The passenger position determined at step 624 is the position within the passenger area of a passenger who used a passenger-owned device to perform an unauthorized intrusion on the network. Determining the passenger position can include using distance vectoring (if the communication-signal information includes actual and optional routes through network nodes traversed by the intrusion signal) and/or multilateration (if the communication-signal information includes timing information for a plurality of network-access devices).

At step 626, method 600 optionally includes associating the determined passenger position (or positions) with a stored camera image of the determined position. The camera image is obtained from the camera images stored at step 616. Typically, the camera image associated with the determined passenger position is an image that was taken at the time the intrusion signal was received by a network-access device proximate the determined position, to increase the likelihood that the camera image includes an image of the passenger responsible for the intrusion. The image can provide confirmation of use of the passenger-owned device at the determined position at the time the intrusion communication was received by a network-access device.

At step 628, method 600 includes identifying the passenger-owned device from which the intrusion communication was sent. The identification is made based at least on part on stored information about network communications (e.g., network use information), and can be additionally based on information obtained and/or correlations performed in other method steps described above.

At step 630, method 600 optionally includes determining at least a first passenger name based on the determined passenger position and the passenger seat assignment information stored at step 602. The name of the passenger can be provided to law-enforcement personnel and/or any other suitable party.

F. Illustrative Combinations and Additional Examples

This section describes additional aspects and features of vehicle network systems, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A correlation engine of a network system on board a vehicle, the network system including a network bus, a network processor connected to the network bus, a network storage area of at least a first storage device connected to the network bus, and a first plurality of wireless network-access devices distributed in a passenger area of the vehicle that are accessible by a passenger using a passenger-owned device having a corresponding wireless communication device, wherein the network processor is configured to detect an unauthorized data intrusion on the network system by the passenger-owned device communicating wirelessly with the network system through at least one of the first plurality of network-access devices; the correlation engine comprising a correlation-engine processor and a correlation-engine storage area of the at least the first storage device; wherein the correlation-engine processor is configured to: (a) receive from the network processor intrusion information associated with a detected unauthorized data intrusion; (b) store on the correlation-engine storage area communications information representative of data communications occurring on the network bus, the data communications including information that is unique to the passenger-owned device; and (c) identify the passenger-owned device based at least in part on the stored communications information.

A2. The correlation engine of paragraph A1, wherein the correlation-engine processor is further configured to assign a unique code to the passenger-owned device, and associate the unique code with communications by the passenger-owned device on the network system.

A3. The correlation engine of any one of paragraphs A1 through A2, wherein the network system further includes a first plurality of network nodes including the first plurality of network-access devices, and the correlation-engine processor is further configured to store communication-signal information for at least one network node of the first plurality of network nodes for communications received by the at least one network-access device from the passenger-owned device, correlate communications information associated with the passenger-owned device with passenger-related information of a passenger based at least in part on the communication-signal information, the passenger-related information including passenger positions, and determine at least one passenger position based on the correlation.

A4. The correlation engine of paragraph A3, wherein the communication-signal information includes timing information for each of a second plurality of network nodes of the first plurality of network nodes for communications transmitted by the passenger-owned device and received by the second plurality of network nodes, and the correlation-engine processor is further configured to determine the at least one passenger position using multilateration based at least in part on the communication-signal information.

A5. The correlation engine of paragraph A4, wherein the intrusion information associated with the detected unauthorized data intrusion includes information regarding a communication signal associated with the detected unauthorized data intrusion, the communication-signal information includes actual and optional routes through network nodes of the first plurality of network nodes traversed by the communication signal associated with the detected unauthorized data intrusion, and the correlation-engine processor is further configured to determine the at least one passenger position using distance vectoring in combination with multilateration based at least in part on the communication-signal information.

A6. The correlation engine of paragraph A3, wherein the intrusion information associated with the detected unauthorized data intrusion includes information regarding a communication signal associated with the detected unauthorized data intrusion, and the correlation-engine processor is further configured to store passenger-area information relating passenger positions to locations of the first plurality of network-access devices, the communication-signal information includes actual and optional routes through network nodes of the first plurality of network nodes traversed by the communication signal associated with the detected unauthorized data intrusion, and the correlation-engine processor is further configured to determine at least one passenger position using distance vectoring based at least in part on the communication-signal information.

A7. The correlation engine of any one of paragraphs A3 through A6, further comprising a plurality of first sensors distributed in predetermined locations in the passenger area, each first sensor being configured to receive a first signal from a first transmitter on the passenger-owned device that is not the wireless communication device, and wherein the correlation-engine processor is configured to store in the correlation-engine storage area first-sensor information associated with the first signal and correlate the first sensor information with the communication-signal information based at least in part on the communications information and the passenger-related information.

A8. The correlation engine of any one of paragraphs A3 through A7, where the passenger area has passenger-positions to which passengers are assigned, and wherein the correlation-engine processor is further configured to store on the correlation-engine storage area passenger-related information including passenger name and associated assigned passenger position, and determine at least a first passenger name based on the determined at least one passenger position.

A9. The correlation engine of any one of paragraphs A3 through A8, where the vehicle further includes a plurality of cameras distributed about the passenger area, and wherein the intrusion information associated with the detected unauthorized data intrusion includes information regarding a communication signal associated with the detected unauthorized data intrusion, and the correlation-engine processor is further configured to store camera images of passenger positions in the passenger area, and associate the determined at least one passenger position with a stored camera image of the determined at least one passenger position taken when the communication signal associated with the detected unauthorized data intrusion was received by a network-access device proximate to the determined at least one passenger position.

A10. The correlation engine of paragraph A9, wherein the correlation-engine processor is further configured to associate a camera image of the determined passenger position taken when an intrusion communication was received from the passenger-owned device by a network-access device proximate to the determined at least one passenger position to provide confirmation of use of the passenger-owned device at the determined at least one passenger position when the intrusion communication was received by a network-access device.

A11. The correlation engine of any one of paragraphs A1 through A10, where the network system is configured to communicate with the passenger-owned device over one of a plurality of channels each having a different channel frequency, and wherein the correlation-engine processor is further configured to assign to the passenger-owned device one of the plurality of channels, and associate the assigned channel with communications by the passenger-owned device on the network system.

B1. A method of relating a data intrusion on a network of a vehicle to a passenger on the vehicle, the network including a network processor, a network storage area of at least a first storage device, and a first plurality of wireless network-access devices distributed in a passenger area of the vehicle that are accessible by the passenger using a passenger-owned device having a corresponding wireless communication device, the method comprising storing on a correlation-engine storage area communications information representative of data communications occurring on the network system, the data communications including information that is unique to the passenger-owned device; receiving from the network processor intrusion information associated with a detected unauthorized data intrusion on the network by the passenger-owned device communicating wirelessly with the network system through at least one of the first plurality of network-access devices; and identifying the passenger-owned device based at least in part on the stored communications information.

B2. The method of paragraph B1, further comprising assigning a unique code to the passenger-owned device, and associating the unique code with communications by the passenger-owned device on the network.

B3. The method of any one of paragraphs B1 through B2, wherein the network further includes a first plurality of network nodes including the first plurality of network-access devices, the method further comprising storing communication-signal information for at least one network node of the first plurality of network nodes for communications received by the at least one network-access device from the passenger-owned device, correlating communications information associated with the passenger-owned device with passenger-related information of the passenger based at least in part on the communication-signal information, the passenger-related information including passenger positions, and determining at least one passenger position based on the correlation.

B4. The method of paragraph B3, where the communication-signal information includes timing information for each of a second plurality of network nodes of the first plurality of network nodes for communications transmitted by the passenger-owned device and received by the second plurality of network nodes, and wherein determining the at least one passenger position includes determining the at least one passenger position using multilateration based at least in part on the communication-signal information.

B5. The method of paragraph B4, where the intrusion information associated with the detected unauthorized data intrusion includes information regarding a communication signal associated with the detected unauthorized data intrusion, the communication-signal information includes actual and optional routes through network nodes of the first plurality of network nodes traversed by the communication signal associated with the detected unauthorized data intrusion, and wherein determining the at least one passenger position includes determining the at least one passenger position using distance vectoring in combination with multilateration based at least in part on the communication-signal information.

B6. The method of paragraph B3, where the intrusion information associated with the detected unauthorized data intrusion includes information regarding a communication signal associated with the detected unauthorized data intrusion, and wherein the method further comprises storing communication-signal information for at least one network-access device of the plurality of network-access devices for communications received by the at least one network-access device from the passenger-owned device and passenger-area information relating passenger positions to locations of the first plurality of network-access devices, the communication-signal information including actual and optional routes through network nodes of the first plurality of network nodes traversed by the communication signal associated with the detected unauthorized data intrusion, and determining the at least one passenger position includes determining the at least one passenger position using distance vectoring based at least in part on the communication-signal information.

B7. The method of any one of paragraphs B3 through B6, where the vehicle includes a plurality of first sensors distributed in predetermined locations in the passenger area, and each first sensor is configured to receive a first signal from a first transmitter on the passenger-owned device that is not the wireless communication device, and wherein the method further comprises storing in the correlation-engine storage area first-sensor information associated with the first signal and correlating the first-sensor information with the communication-signal information based at least in part on the communications information and the passenger-related information.

B8. The method of paragraph B3, where the passenger area has passenger-positions to which passengers are assigned, and wherein the method further comprises storing on the correlation-engine storage area passenger-related information including passenger name and seat assignment for passengers, and determining at least a first passenger name based on the determined at least one seat location.

B9. The method of any one of paragraphs B3 through B8, where the vehicle further includes a plurality of cameras distributed about the passenger area and the intrusion information associated with the detected unauthorized data intrusion includes information regarding a communication signal associated with the detected unauthorized data intrusion, and wherein the method further comprises storing camera images of passenger positions in the passenger area, and the method further comprising associating the determined at least one passenger position with a stored camera image of the determined at least one passenger position taken when the communication signal associated with the detected unauthorized data intrusion was received by a network-access device proximate to the determined at least one passenger position.

B10. The method of paragraph B9, wherein associating the determined at least one passenger position with a stored camera image includes associating a camera image of the determined passenger position taken when an intrusion communication was received from the passenger-owned device by a network-access device proximate to the determined at least one passenger position to provide confirmation of use of the passenger-owned device at the determined at least one passenger position when the intrusion communication was received by a network-access device.

B11. The method of any one of paragraphs B1 through B10, where the network is configured to communicate with the passenger-owned device over one of a plurality of channels each having a different channel frequency, and wherein the method further comprises assigning to the passenger-owned device one of the plurality of channels, and associating the assigned channel with communications by the passenger-owned device on the network.

C1. A computer program product for relating a data intrusion on a network of a vehicle to a passenger on the vehicle, the network including a network processor, a network storage area of at least a first storage device, and a first plurality of wireless network-access devices distributed in a passenger area of the vehicle that are accessible by a passenger using a passenger-owned device having a corresponding wireless communication device, the computer program product comprising:

a non-transitory computer-readable storage medium having computer-readable program code embodied therewith, the computer-readable program code configured to cause a data processing system to determine the identification, the computer-readable program code comprising:

at least one instruction to store on a correlation-engine storage area communications information representative of data communications occurring on the network, the data communications including information that is unique to the passenger-owned device, at least one instruction to receive from the network processor intrusion information associated with a detected unauthorized data intrusion on the network by the passenger-owned device communicating wirelessly with the network through at least one of the first plurality of network-access devices; and at least one instruction to identify the passenger-owned device based at least in part on the stored communications information.

C2. The computer program product of paragraph C1, wherein the computer-readable program code further includes at least one instruction to assign a unique code to the passenger-owned device, and at least one instruction to associate the unique code with communications by the passenger-owned device on the network.

C3. The computer program product of any one of paragraphs C1 through C2, wherein the network further includes a first plurality of network nodes including the first plurality of network-access devices, and the computer-readable program code further includes at least one instruction to store communication-signal information for at least one network node of the first plurality of network nodes for communications received by the at least one network-access device from the passenger-owned device, at least one instruction to correlate communications information associated with the passenger-owned device with passenger-related information of a passenger based at least in part on the communication-signal information, the passenger-related information including passenger positions, and at least one instruction to determine at least one passenger position based on the correlation.

C4. The computer program product of paragraph C3, where the communication-signal information includes timing information for each of a second plurality of network nodes of the first plurality of network nodes for communications transmitted by the passenger-owned device and received by the second plurality of network nodes, and wherein the computer-readable program code further includes at least one instruction to determine the at least one passenger position using multilateration based at least in part on the communication-signal information.

C5. The computer program product of paragraph C4, where the intrusion information associated with the detected unauthorized data intrusion includes information regarding a communication signal associated with the detected unauthorized data intrusion, the communication-signal information includes actual and optional routes through network nodes of the first plurality of network nodes traversed by the communication signal associated with the detected unauthorized data intrusion, and wherein the computer-readable program code further includes at least one instruction to determine the at least one passenger position using distance vectoring in combination with multilateration based at least in part on the communication-signal information.

C6. The computer program product of paragraph C3, wherein the intrusion information associated with the detected unauthorized data intrusion includes information regarding a communication signal associated with the detected unauthorized data intrusion, and the computer-readable program code further includes at least one instruction to store passenger-area information relating passenger positions to locations of the first plurality of network-access devices, the communication-signal information including actual and optional routes through network nodes of the first plurality of network nodes traversed by the communication signal associated with the detected unauthorized data intrusion, and at least one instruction to determine the at least one passenger position using distance vectoring based at least in part on the communication-signal information.

C7. The computer program product of any one of paragraphs C3 through C6, where the vehicle includes a plurality of first sensors distributed in predetermined locations in the passenger area, and each first sensor is configured to receive a first signal from a first transmitter on the passenger-owned device that is not the wireless communication device, and wherein the computer-readable program code further includes at least one instruction to store in the correlation-engine storage area first-sensor information associated with the first signal and at least one instruction to correlate the first-sensor information with the communication-signal information based at least in part on the communications information and the passenger-related information.

C8. The computer program product of paragraph C3, where the passenger area has passenger-positions to which passengers are assigned, and wherein the computer-readable program code further includes at least one instruction to store on the correlation-engine storage area passenger-related information including passenger name and seat assignment for passengers, and at least one instruction to determine at least a first passenger name based on the determined at least one seat location.

C9. The computer program product of any one of paragraphs C3 through C8, where the vehicle further includes a plurality of cameras distributed about the passenger area, and wherein the intrusion information associated with the detected unauthorized data intrusion includes information regarding a communication signal associated with the detected unauthorized data intrusion, and wherein the computer-readable program code further includes at least one instruction to store camera images of passenger positions in the passenger area, and at least one instruction to associate the determined at least one passenger position with a stored camera image of the determined at least one passenger position taken when the communication signal associated with the detected unauthorized data intrusion was received by a network-access device proximate to the determined at least one passenger position.

C10. The computer program product of paragraph C9, wherein the computer-readable program code further includes at least one instruction to associate a camera image of the determined passenger position taken when an intrusion communication was received from the passenger-owned device by a network-access device proximate to the determined at least one passenger position to provide confirmation of use of the passenger-owned device at the determined at least one passenger position when the intrusion communication was received by a network-access device.

C11. The computer program product of any one of paragraphs C1 through C10, where the network is configured to communicate with the passenger-owned device over one of a plurality of channels each having a different channel frequency, and wherein the computer-readable program code further includes at least one instruction to assign to the passenger-owned device one of the plurality of channels, and at least one instruction to associate the assigned channel with communications by the passenger-owned device on the network.

D1. A network system on board an aircraft, the network system comprising a network processor; a network storage device operatively coupled to the network processor; and a first plurality of wireless network-access devices distributed in a passenger cabin of the aircraft that are accessible by a passenger using a passenger-owned device having a corresponding wireless communication device; wherein the network processor is configured to: (a) store on the network storage device: (i) communications information representative of data communications occurring on the network system, the data communications including information that is unique to the passenger-owned device, (ii) network use information representative of network-access devices of the plurality of the network-access devices used for communications received from the passenger-owned device, and (iii) passenger-cabin configuration information relating passenger seat locations to locations of the first plurality of wireless network-access devices; (b) detect an unauthorized data intrusion on the network system by the passenger-owned device communicating wirelessly with the network system through at least one of the first plurality of network-access devices; and (c) determine at least one seat location associated with the passenger-owned device based at least in part on the stored communications information, network use information, and passenger-cabin-configuration information.

D2. The network system of paragraph D1, wherein the network processor is further configured to correlate communications information associated with the passenger-owned device with the network use information and the passenger-cabin-configuration information, and to determine the at least one seat location based at least in part on the correlation.

D3. The network system of any one of paragraphs D1 through D2, wherein the network processor is further configured to assign a unique code to the passenger-owned device, and associate the unique code with communications by the passenger-owned device on the network system.

D4. The network system of any one of paragraphs D1 through D3, wherein the network system further includes a first plurality of network nodes including the first plurality of network-access devices, and the network processor is further configured to store communication-signal information for at least one network nodes of the first plurality of network nodes for communications received by the at least one network-access device from the passenger-owned device, correlate communications information associated with the passenger-owned device with passenger-related information including passenger seat location of a passenger based at least in part on the communication-signal information, and determine at least one passenger seat location based on the correlation.

D5. The network system of paragraph D4, wherein the communication-signal information includes timing information for each of a second plurality of network nodes of the first plurality of network nodes for communications transmitted by the passenger-owned device and received by the second plurality of network nodes, and the network processor is further configured to determine the at least one passenger seat location using multilateration based at least in part on the communication-signal information.

D6. The network system of paragraph D5, wherein the communication-signal information includes actual and optional routes through network nodes of the first plurality of network nodes traversed by an intrusion communication signal, and the network processor is further configured to determine the at least one passenger seat location using distance vectoring in combination with multilateration based at least in part on the communication-signal information.

D7. The network system of paragraph D4, wherein the network processor is further configured to store passenger-area information relating passenger seat locations to locations of the first plurality of network-access devices, the communication-signal information includes actual and optional routes through network nodes of the first plurality of network nodes traversed by an intrusion communication signal, and the network processor is further configured to determine at least one passenger seat location using distance vectoring based at least in part on the communication-signal information.

D8. The network system of any one of paragraphs D4 through D7, further comprising a plurality of first sensors distributed in predetermined locations in the passenger area, each first sensor being configured to receive a first signal from a first transmitter on the passenger-owned device that is not the wireless communication device, and wherein the network processor is configured to store in the network storage area first-sensor information associated with the first signal and correlate the first sensor information with the communication-signal information based at least in part on the communications information and the passenger-related information.

D9. The network system of paragraph D4, where the passenger area has passenger-seat locations to which passengers are assigned, and wherein the network processor is further configured to store on the network storage area passenger-related information including passenger name and associated assigned passenger seat location, and determine at least a first passenger name based on the determined at least one passenger seat location.

D10. The network system of any one of paragraphs D4 through D9, where the aircraft further includes a plurality of cameras distributed about the passenger area, and the network processor is further configured to store camera images of passenger seat locations in the passenger area, and associate the determined at least one passenger seat location with a stored camera image of the determined at least one passenger seat location taken when an intrusion signal was received by a network-access device proximate to the determined at least one passenger seat location.

D11. The network system of any one of paragraphs D1 through D10, where the network system is configured to communicate with the passenger-owned device over one of a plurality of channels each having a different channel frequency, and the network processor is further configured to assign to the passenger-owned device one of the plurality of channels, and associate the assigned channel with communications by the passenger-owned device on the network system.

D12. The network system of any one of paragraphs D1 through D11 further comprising at least one aircraft operations system coupled to the network processor, the at least one aircraft operations system not being directly accessible on the network system by a passenger using authorized operations of the passenger-owned device, the aircraft operations system including a second plurality of wireless access devices not including the first plurality of wireless access devices; and a passenger-based system coupled to the network processor, the passenger-based system including the first plurality of wireless access devices; wherein the network processor is further configured to detect an unauthorized data intrusion on the at least one aircraft operations system by the passenger-owned device communicating wirelessly with the network system through at least one of the second plurality of network-access devices.

Advantages, Features, and Benefits

The different embodiments and examples of the vehicle network system described herein provide several advantages over known solutions for deterring unauthorized data intrusions on vehicle networks. For example, illustrative embodiments and examples described herein allow for identifying a passenger-owned device that has attempted to access a restricted portion of the vehicle network (e.g., that has performed a penetration test). This allows the passenger associated with the device to be identified and investigated.

Additionally, and among other benefits, illustrative embodiments and examples described herein allow sensor fusion of data from multiple sources related to the position of a passenger-owned device responsible for a data intrusion. Sensor fusion can determine the position of the intruding device with high certainty.

Additionally, and among other benefits, illustrative embodiments and examples described herein allow for providing information about a passenger who has attempted an unauthorized vehicle network intrusion to a security and/or law-enforcement center while the passenger is on the vehicle. Accordingly, security personnel are able to board the vehicle and detain the passenger, or detain the passenger as the passenger exits the vehicle.

Additionally, and among other benefits, illustrative embodiments and examples described herein allow for non-repudiation. That is, illustrative embodiments and examples described herein can identify with high certainty a passenger-owned device responsible for a network intrusion. Because of the high certainty of the identification, it is difficult for the operator of the passenger-owned device to deny (e.g., in a criminal and/or civil proceeding) that they are responsible for the intrusion. Accordingly, illustrative embodiments and examples described herein can be beneficial even in situations wherein the identity of the passenger operating the intruding device can be tentatively ascertained by conventional means. For example, systems and methods of the present disclosure can be used to provide evidence if a passenger or group has claimed responsibility for the intrusion, if one or more passengers claim to have witnessed another passenger attempting the intrusion, if the number of passengers on the vehicle is so small that detaining and/or questioning all of the passengers is feasible, and/or in any other situation wherein a small number of suspects can be identified.

Additionally, and among other benefits, illustrative embodiments and examples described herein allow for deterring passengers from attempting unauthorized vehicle network intrusions due to the high probability of being identified. Accordingly, the frequency of intrusion attempts is decreased. This improves the security of the vehicle, and saves time and money that the vehicle operator (e.g., an airline) would otherwise spend responding to intrusion attempts.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A correlation engine of a network system on board a vehicle, the network system including a network bus, a network processor connected to the network bus, a network storage area of at least a first storage device connected to the network bus, a first plurality of wireless network-access devices distributed in a passenger area of the vehicle that are accessible by a passenger using a passenger-owned device having a corresponding wireless communication device, and a first plurality of network nodes including the first plurality of network-access devices, wherein the network processor is configured to detect an unauthorized data intrusion on the network system by the passenger-owned device communicating wirelessly with the network system through at least one of the first plurality of network-access devices; the correlation engine comprising:
   a correlation-engine processor, and
   a correlation-engine storage area of the at least the first storage device;
   wherein the correlation-engine processor is configured to:
      (a) receive from the network processor intrusion information associated with a detected unauthorized data intrusion, including information regarding a communication signal associated with the detected unauthorized data intrusion;
      (b) store on the correlation-engine storage area communications information including information that is unique to the passenger-owned device, and including actual and optional routes through network nodes of the first plurality of network nodes traversed by the communication signal associated with the detected unauthorized data intrusion;

(c) store passenger-area information relating passenger positions to locations of the first plurality of network-access devices; and (d) determine a position of the passenger in the passenger area using distance vectoring based at least in part on the stored communications signal route information.

2. The correlation engine of claim 1, wherein the correlation-engine processor is further configured to assign a unique code to the passenger-owned device, and associate the unique code with communications by the passenger-owned device on the network system.

3. The correlation engine of claim 2, wherein the network system further includes a first plurality of network nodes including the first plurality of network-access devices, and the correlation-engine processor is further configured to:

store communication-signal information for at least one network node of the first plurality of network nodes for communications received by the at least one network-access device from the passenger-owned device, and correlate communications information associated with the passenger-owned device with passenger-related information of a passenger based at least in part on the communication-signal information, the passenger-related information including passenger positions, wherein the correlation-engine processor is configured to determine the position of the passenger based on the correlation.

4. The correlation engine of claim 3, wherein the communication-signal information includes timing information for each of a second plurality of network nodes of the first plurality of network nodes for communications transmitted by the passenger-owned device and received by the second plurality of network nodes, and the correlation-engine processor is configured to determine the position of the passenger using multilateration based at least in part on the communication-signal information.

5. The correlation engine of claim 3, further comprising a plurality of first sensors distributed in predetermined locations in the passenger area, each first sensor being configured to receive a first signal from a first transmitter on the passenger-owned device that is not the wireless communication device, and wherein the correlation-engine processor is configured to store in the correlation-engine storage area first-sensor information associated with the first signal and correlate the first sensor information with the communication-signal information based at least in part on the communications information and the passenger-related information.

6. The correlation engine of claim 3, where the vehicle further includes a plurality of cameras distributed about the passenger area, and wherein the intrusion information associated with the detected unauthorized data intrusion includes information regarding a communication signal associated with the detected unauthorized data intrusion, and the correlation-engine processor is further configured to store camera images of passenger positions in the passenger area, and associate the determined position of the passenger with a stored camera image of the determined position of the passenger taken when the communication signal associated with the detected unauthorized data intrusion was received by a network-access device proximate to the determined position of the passenger.

7. The correlation engine of claim 1, where the network system is configured to communicate with the passenger-owned device over one of a plurality of channels each having a different channel frequency, and wherein the correlation-engine processor is further configured to assign to the passenger-owned device one of the plurality of channels, and associate the assigned channel with communications by the passenger-owned device on the network system.

8. A method of relating a data intrusion on a network of a vehicle to a passenger on the vehicle, the network including a network processor, a network storage area of at least a first storage device, a first plurality of wireless network-access devices distributed in a passenger area of the vehicle that are accessible by the passenger using a passenger-owned device having a corresponding wireless communication device, a first plurality of network nodes including the first plurality of network-access devices, and a plurality of cameras distributed about the passenger area, the method comprising:

storing on a correlation-engine storage area communications information representative of data communications occurring on the network, the data communications including information that is unique to the passenger-owned device and the communications information including information regarding a communication signal associated with the detected unauthorized data intrusion, receiving from the network processor intrusion information associated with a detected unauthorized data intrusion on the network by the passenger-owned device communicating wirelessly with the network system through at least one of the first plurality of network-access devices;

storing communication-signal information for at least one network node of the first plurality of network nodes for communications received by the at least one network-access device from the passenger-owned device; and correlating communications information associated with the passenger-owned device with passenger-related information of the passenger based at least in part on the communication-signal information, the passenger-related information including passenger positions;

determining a location of the passenger-owned device based at least in part on the communications information correlation;

storing camera images of passenger positions in the passenger area; and associating the determined location with a stored camera image of the determined location taken when the communication signal associated with the detected unauthorized data intrusion was received by a network-access device proximate to the determined location.

9. The method of claim 8, further comprising assigning a unique code to the passenger-owned device, and associating the unique code with communications by the passenger-owned device on the network.

10. The method of claim 8, wherein the network further includes a first plurality of network nodes including the first plurality of network-access devices, the method further comprising:

storing communication-signal information for at least one network node of the first plurality of network nodes for communications received by the at least one network-access device from the passenger-owned device, and correlating communications information associated with the passenger-owned device with passenger-related information of the passenger based at least in part on the communication-signal information, the passenger-related information including passenger positions, wherein determining a location of the passenger-owned device includes determining at least one passenger position based on the correlation.

11. The method of claim 10, where the communication-signal information includes timing information for each of a second plurality of network nodes of the first plurality of network nodes for communications transmitted by the passenger-owned device and received by the second plurality of network nodes, and wherein determining the at least one passenger position includes determining the at least one passenger position using multilateration based at least in part on the communication-signal information.

12. The method of claim 10, where the intrusion information associated with the detected unauthorized data intrusion includes information regarding a communication signal associated with the detected unauthorized data intrusion, and wherein the method further comprises storing communication-signal information for at least one network-access device of the plurality of network-access devices for communications received by the at least one network-access device from the passenger-owned device and passenger-area information relating passenger positions to locations of the first plurality of network-access devices, the communication-signal information including actual and optional routes through network nodes of the first plurality of network nodes traversed by the communication signal associated with the detected unauthorized data intrusion, and determining the at least one passenger position includes determining the at least one passenger position using distance vectoring based at least in part on the communication-signal information.

13. The method of claim 10, where the vehicle includes a plurality of first sensors distributed in predetermined locations in the passenger area, and each first sensor is configured to receive a first signal from a first transmitter on the passenger-owned device that is not the wireless communication device, and wherein the method further comprises storing in the correlation-engine storage area first-sensor information associated with the first signal and correlating the first-sensor information with the communication-signal information based at least in part on the communications information and the passenger-related information.

14. The method of claim 8, where the network is configured to communicate with the passenger-owned device over one of a plurality of channels each having a different channel frequency, and wherein the method further comprises assigning to the passenger-owned device one of the plurality of channels, and associating the assigned channel with communications by the passenger-owned device on the network.

15. A network system on board an aircraft, the network system comprising
a network processor;
a network storage device operatively coupled to the network processor; and
a first plurality of wireless network-access devices distributed in a passenger cabin of the aircraft that are accessible by a passenger using a passenger-owned device having a corresponding wireless communication device;
wherein the network processor is configured to:
(a) store on the network storage device:
(i) communications information representative of data communications occurring on the network system, the data communications including information that is unique to the passenger-owned device,
(ii) network use information representative of network-access devices of the plurality of the network-access devices used for communications received from the passenger-owned device, and
(iii) passenger-cabin configuration information relating passenger seat locations to locations of the first plurality of wireless network-access devices;
(b) detect an unauthorized data intrusion on the network system by the passenger-owned device communicating wirelessly with the network system through at least one of the first plurality of network-access devices; and
(c) determine at least one seat location associated with the passenger-owned device based at least in part on the stored communications information, network use information, and passenger-cabin-configuration information
wherein the network use information includes timing of the communications received from the passenger-owned device, and determining the at least one seat location associated with the passenger-owned device includes using multilateration based on the timing information.

16. The network system of claim 15, wherein the network processor is further configured to correlate communications information associated with the passenger-owned device with the network use information and the passenger-cabin-configuration information, and to determine the at least one seat location based at least in part on the correlation.

17. The network system of claim 15, wherein the network processor is further configured to assign a unique code to the passenger-owned device, and associate the unique code with communications by the passenger-owned device on the network system.

18. The network system of claim 15, wherein determining the at least one seat location associated with the passenger-owned device includes using a combination of multilateration and distance vectoring based on the stored network use information.

19. The network system of claim 15, wherein the timing information includes differences in arrival times of a first communication from the passenger-owned device, to the plurality of network-access devices.

20. The network system of claim 19, wherein using multilateration includes calculating a hyperboloid defining possible positions of the passenger-owned device based on the differences in arrival times.

* * * * *